United States Patent
Van Hook et al.

(10) Patent No.: US 6,353,438 B1
(45) Date of Patent: Mar. 5, 2002

(54) CACHE ORGANIZATION—DIRECT MAPPED CACHE

(75) Inventors: Timothy Van Hook, Ath; Anthony P. DeLaurier, Sunnyvale, both of CA (US)

(73) Assignee: ArtX, Palo Alto, CA (US)

( * ) Notice: Subject to any disclaimer, the term of this patent is extended or adjusted under 35 U.S.C. 154(b) by 0 days.

(21) Appl. No.: 09/244,690

(22) Filed: Feb. 3, 1999

(51) Int. Cl.[7] .............................................. G06T 11/40

(52) U.S. Cl. ...................... 345/552; 345/557; 345/540; 345/564; 345/556; 345/587; 711/118; 711/127

(58) Field of Search ................................ 345/552, 557, 345/540, 556, 430, 564, 419, 561, 428, 429, 582, 583, 587; 711/118, 127, 128, 154, 157

(56) References Cited

U.S. PATENT DOCUMENTS

| | | | |
|---|---|---|---|
| 5,544,292 A | * 8/1996 | Winser ........................ 395/130 |
| 5,767,858 A | * 6/1998 | Kawase et al. ............. 345/430 |
| 5,831,640 A | * 11/1998 | Wang et al. ................. 345/521 |
| 5,859,646 A | * 1/1999 | Takenaka .................... 345/433 |
| 5,945,997 A | * 8/1999 | Zhao et al. ................. 345/430 |
| 6,011,565 A | * 1/2000 | Kuo et al. ................... 345/513 |
| 6,067,089 A | * 5/2000 | Funakubo .................... 345/430 |
| 6,111,585 A | * 8/2000 | Choi ............................ 345/430 |
| 6,130,674 A | * 10/2000 | Vaswani et al. ............. 345/430 |
| 6,144,392 A | * 11/2000 | Rogers ........................ 345/511 |

\* cited by examiner

Primary Examiner—Kee M. Tung
(74) Attorney, Agent, or Firm—J. D. Harriman, II, Esq.; Coudert Brothers LLP

(57) ABSTRACT

The invention provides for cache organization of texture information and a method and apparatus for accessing cached texture information and an index for cached information. Texels are represented in two dimensions and stored in groups referred to as tiles. Cache is configured to contain multiple tiles of texture image data, each tile being stored as a line in the cache. A cache line can be multidimensional (e.g., two or three or more dimensions) and may be viewed as an identifiable storage element in the cache. Memory may consist of a plurality of cache lines. Direct mapped cache may be utilized wherein each DRAM location maps to a single cache line. A tag table contains the tag information for all tiles currently stored in cache. A portion of the texel information may be utilized as an index assigned to a specific cache line. Another portion of the tag information identifies the tile currently stored in cache. A portion of the S bits and a portion of the T bits are utilized as the index and tile information. The tags may be organized into sections (referred to as tag banks) with the cache lines interleaved in two dimensions across the tag banks. Additionally, when mipmapping, the level of detail may be specified as part of the tag information. Cache access requests that are not currently active may also be stored in an interleaved list or queue until they are completed.

111 Claims, 13 Drawing Sheets

FIGURE 14A

| 0 | 1 | 2 | 3 |
|---|---|---|---|
| 0 | 1 | 2 | 3 |
| 0 | 1 | 2 | 3 |
| 0 | 1 | 2 | 3 |

| 0 | 1 | 0 | 1 |
|---|---|---|---|
| 2 | 3 | 2 | 3 |
| 0 | 1 | 0 | 1 |
| 2 | 3 | 2 | 3 |

1410  1414  1416  1412

CACHE ORGANIZATION— DIRECT MAPPED CACHE

BACKGROUND OF THE INVENTION

1. Field of the Invention

This invention relates to the field of computer graphics and caching, and, more specifically, to the caching of computer graphics elements.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. ArtX and all ArtX-based trademarks and logos are trademarks or registered trademarks of ArtX, Inc. in the United States and other countries.

2. Background Art

Computers are often used to display graphical information. In some instances, graphical data or images are "rendered" by executing instructions from an application that is drawing the data or image to a display. An image is a regular two dimensional array in which every element of the array is a digital quantity of energy such as light/heat/density, etc. An image may also be viewed as a discretely sampled digital representation of an energy continuum with the same number of elements in each row. The image can also be procedurally generated dynamically at the time of display by the computer program or sampling device, for example. A displayed image may be made up of a plurality of graphical objects. Examples of graphical objects include points, lines, polygons, and three dimensional solid objects.

If you looked closely at a television screen, computer display, magazine page, etc., you would see that an image is made up of hundreds or thousands of tiny dots, where each dot is a different color. These dots are known as picture elements, or "pixels" for short when they are on a computer display and as dots when printed on a page. The color of each pixel is represented by a number value. To store an image in a computer memory, the number value of each pixel of the picture is stored. The number value represents the color and intensity of the pixel.

The accuracy with which a document can be reproduced is dependent on the "resolution" of the pixels that make up the document. The resolution of a pixel is the size of the number value used to describe that pixel. The size of the number value is limited by the number of "bits" in the memory available to describe each pixel (a bit is a binary number having a value of 1 or 0). The greater the number of bits available per pixel, the greater the resolution of the document. For example, when only one bit per pixel is available for storage, only two values are available for the pixel. If two bits are available, four levels of color or intensity are available. While greater resolution is desirable, it can lead to greater use of data storage. For example, if each pixel is represented by a 32-bit binary number, 320,000 bits of information would be required to represent a 100×100 pixel image. Such information is stored in what is referred to as a "Frame Buffer" (or "G array").

The process of converting graphics data and instructions into a display image is known as "pixel rendering." During pixel rendering, color and other details can be applied to areas and surfaces of these objects using "texture mapping" techniques. In texture mapping, a texture image (also referred to as a texture map, or simply as a texture) is mapped to an area or surface of a graphical object to produce a visually modified object with the added detail of the texture image. A texture image may contain, for example, an array of RGB (red, green, blue) color values, intensity values, or opacity values.

As an example of texture mapping, given a featureless graphical object in the form of a cube and a texture image defining a wood grain pattern, the wood grain pattern of the texture image may be mapped onto one or more surfaces of the cube such that the cube appears to be made out of wood. Other examples of texture mapping include mapping of product logo texture images to computer-modeled products, or mapping of texture images containing vegetation and trees to a barren computer-modeled landscape. Textures mapped onto geometric surfaces may also be used to provide additional motion and spatial cues that surface shading alone might not be capable of providing. For example, a featureless sphere rotating about an axis appears static until an irregular texture image or pattern is mapped to its surface.

Texture mapping involves using a texture image having a function defined in texture space. Typically, the texture space is represented as a two dimensional space, with "S" and "T" indices defining orthogonal axes (e.g., horizontal and vertical). A texture image is represented in texture space as an array in S and T of discrete texture elements or values called "texels." The texture image is warped or mapped from the texture space into an image space having an array of picture elements called "pixels." The pixels are associated with orthogonal axis coordinates "X" and "Y" in the image space which define a viewing plane for display. Based on the particular mapping function, a correspondence is generated between pixels representing an object or primitive in the image space and texels representing a texture image in the texture space.

Typically, a two-dimensional texture or pattern image is mapped onto a two or three-dimensional surface. For a two-dimensional surface, X and Y coordinates may be sufficient for defining a mapping function between pixels forming the surface and texels forming the texture image. For a three-dimensional surface, a perspective coordinate or other depth cueing mechanism may be provided to indicate distance from the viewing plane defined by the X and Y axes. The perspective coordinate may then be applied to the mapping function. For example, as the perspective coordinate value for a surface region increases (i.e., the surface region is further from the viewing plane), the mapping of the texture image may be darkened and/or compressed (i.e., neighboring pixels in the surface region will span an increased number of texels in the texture image), or otherwise warped, relative to surface regions having a lower perspective coordinate value. Through the application of depth cueing, the viewer is provided with a sense of distance or depth when viewing the rendered pixels.

FIGS. 1A–1C illustrate a mapping of a brick-pattern texture image in texture space to a triangle primitive (100) in image space. FIG. 1A illustrates triangle primitive 100 in image space prior to texture mapping. FIG. 1B illustrates the brick-pattern texture image in texture space. FIG. 1C illustrates triangle primitive 100 in image space after texture mapping has completed.

In FIG. 1A, triangle primitive 100 is defined by vertices at X,Y coordinate pixel locations $P_A(X_A,Y_A)$, $P_B(X_B,Y_B)$ and $P_C(X_C,Y_C)$, where X is the horizontal axis and Y is the vertical axis. Pixels defining the perimeter of triangle primitive 100 may be explicitly stored in memory, or, to reduce storage requirements for individual primitives, the perimeter pixels may be linearly interpolated from the vertices defined by pixel locations $P_A(X_A,Y_A)$, $P_B(X_B,Y_B)$ and $P_C(X_C,Y_C)$. The interior of triangle primitive 100 is formed by those pixel locations that lie within the defined perimeter. The surface of triangle primitive 100 in this example comprises the union of the perimeter pixels (including the vertices) and the interior pixels.

In FIG. 1B, a brick pattern is stored as a texture image referenced by S and T coordinates. The brick pattern may be mapped to pixels in image space by accessing texels at integer S and T coordinates. In accordance with a particular mapping function, pixel vertices $P_A$, $P_B$ and $P_C$ of the triangle primitive correspond to S and T coordinates $(S_A,T_A)$, $(S_B,T_B)$ and $(S_C,T_C)$, respectively. The orientation of the mapped vertices indicates rotation and scaling of triangle primitive 100 with respect to the S and T texture space.

FIG. 1C shows triangle primitive 100 having pixel vertices with corresponding X,Y coordinates for the image space, as well as texture space S,T coordinates for extracting texel values. The pixel vertices are $P_A(X_A,Y_A; S_A,T_A)$, $P_B(X_B,Y_B; S_B,T_B)$ and $P_C(X_C,Y_C; S_C,T_C)$. The brick pattern of the texture image of FIG. 1B appears within triangle primitive 100 at slightly reduced scale, and at an approximately forty-five degree rotational offset from the X-axis. Other texture images may be similarly texture mapped to surfaces in render operations.

As the pixels defining a surface are rendered, S and T coordinate values are generated for each pixel based on the mapping function. The generated S and T coordinate values are then used to obtain a texel value for each rendered pixel in the image space. However, the generated S and T coordinate values are generally fractional values (i.e., not integer values). Consequently, the generated S and T coordinate values often correspond to a location in the texture space that falls between the texels of the texture image array.

Several options exist for selecting a texture value, given real S and T coordinate values. One of the simplest options is to round the S and T coordinate values to the nearest integers, and then select the texel corresponding to the rounded integer coordinate values. A more accurate representation is produced by interpolating between the four nearest samples that surround the real (S,T) location. For example, a bilinear interpolation algorithm (i.e., bilinear filtering), or higher-order interpolation algorithm, may be used to interpolate texel values for fractional S and T coordinates. Bilinear interpolation is illustrated in FIG. 2.

In FIG. 2, a pixel $P_N$ is mapped to S and T coordinates $(L+\alpha,M+\beta)$. The four nearest texels in texture space are TXL(L,M), TXL(L+1,M), TXL(L,M+1) and TXL(L+1,M+1). To perform bilinear interpolation (or filtering), a linear interpolation is performed between the texel pairs [TXL(L,M), TXL(L+1,M)] and [TXL(L,M+1), TXL(L+1,M+1)] to determine intermediate pixel values $P_N'$ (L+$\alpha$,M) and $P_N''$ (L+$\beta$,M+1), respectively. These linear interpolation functions are performed to implement equations (1) and (2) below.

$$P'_N(L+\alpha,M)=(1-\alpha)TXL(L,M)+\alpha TXL(L+1,M) \quad (1)$$

$$P''_N(L+\alpha,M+1)=(1-\alpha)TXL(L,M+1)+\alpha TXL(L+1,M+1) \quad (2)$$

A third linear interpolation operation is performed on intermediate pixel values $P'_N(L+\alpha,M)$ and $P''_N(L+\alpha,M+1)$ to obtain $P_N(L+\alpha,M+\beta)$ in accordance with the following equation (3). The linear interpolation operations for the intermediate pixels may be performed along the opposite axis as well, or the linear interpolation operations may be combined to implement a form of equation (4) below.

$$P_N(L+\alpha,M+\beta)=(1-\beta)P'_N(L+\alpha,M)+\beta P''_N(L+\alpha,M+1) \quad (3)$$

$$=[1-(\alpha+\beta)+\alpha\beta]TXL(L,M)+[\alpha(1-\beta)]TXL(L+1,M)+[\beta(1-\alpha)]TXL(L,M+1)+\alpha\beta TXL(L+1,M+1) \quad (4)$$

The above equations (1)–(4) may be implemented in any equivalent form, or the equations may be approximated, to optimize the calculation apparatus for speed and/or complexity.

Using the texel selection processes described above, severe aliasing of the texture may occur if the surface being texture-mapped is far from the viewing plane. This aliasing is caused when the reduced pixel resolution provides insufficient sampling of texture images that have higher frequency components (e.g., fast transitioning color or intensity values). The interpolated (S,T) values may skip over large areas of the texture. A technique known as MIP-mapping is often performed to prevent aliasing by precomputing multiple, filtered copies of the texture at successively lower resolutions. For example, a texture image comprising a 256×256 texel array would be filtered and resampled to obtain further texel arrays (or maps) at 128×128, 64×64, 32×32, 16×16, 8×8, 4×4, and 2×2 resolutions. The cost of storing the additional texel arrays is an increase of approximately thirty percent in memory size.

The particular size of the texel array that is used during pixel rendering is chosen based on a computer parameter known as the "level of detail." The level of detail represents the relative distance between the interpolated S and T values. Each texel array size represents an integer level of detail, and the computed level of detail values are real numbers. High quality texture mapping is obtained by performing bilinear interpolation in the texel array representing the integer level of detail immediately above and below the computed level of detail of each pixel. Next, a linear interpolation is performed between the integer levels of detail to obtain the texture value at the non-integer level of detail. This process is known as trilinear MIP-mapping.

To facilitate texture mapping, a texture image may be stored in a dynamic random access memory (DRAM) device. The texel values of the texture image are accessed from the DRAM as needed to determine pixel values for a rendered image in the frame buffer. Unfortunately, DRAM devices are inefficient when performing data transfer operations (e.g., data reads) for individual data values. Peak efficiency is achieved when transferring multiple data values, especially data values that are in adjacent memory locations. For example, for a burst transfer of data in consecutive locations, a DRAM device may support a transfer rate of eight bytes per clock cycle. The same DRAM device may have a transfer rate of one byte per nine clock cycles for arbitrary single byte transfers. These performance characteristics are not well-suited to texture mapping.

In texture mapping operations, pixel values for a frame buffer are often determined in a particular scan order, such as by scanning in the direction of the X axis. However, texels associated with consecutive pixels are rarely in a predictable scan order with respect to texture space. For example, in the texture mapping process of FIGS. 1A–1C, a scan along the X axis in image space results in a scan pattern in the texture space that includes multiple passes from the left edge (T axis) of the texture image towards the upper right of the texture image. FIG. 3 illustrates the scan direction in texture space for the texture mapping of FIGS. 1A–1C. As shown, each scan arrow represents texel accesses that frequently traverse, or "skip", rows, including large skips between the ending of one scan arrow and the beginning of the next scan arrow based on the boundaries defined by the primitive in image space.

For a linearly configured DRAM, for example, because the texels in a texture image are not typically scanned in a linear path along the S axis, consecutive pixels will access texels that are widely dispersed across memory. For a 1024×1024 texture image in which each texel is one byte wide, a traversal of one integer T coordinate may translate to a skip of 1024 bytes in DRAM. These memory skips are not easily predictable because the skips are dependent upon the size of the image, the width of a texel, the rotational angle between the S,T axes and the X,Y axes, etc. Texture mapping may also be nonlinear for irregular surfaces, further dispersing memory access operations.

FIG. 4 illustrates an example pixel scan line progressing through a portion of a texel array. The texel array shown encompasses the range [L, L+5] in the S direction and [M,M+4] in the T direction. The pixels that form the scan line comprise $P_N$, $P_{N+1}$, $P_{N+2}$, $P_{N+3}$, $P_{N+4}$, $P_{N+5}$ and $P_{N+6}$. $P_N$ lies within the texel neighborhood formed by texels at (L,M+1), (L+1,M+1), (L,M+2) and (L+1,M+2). Pixel $P_{N+1}$ has a texel neighborhood of texels at (L+1,M), (L+2,M), (L+1,M+1), and (L+2,M+1). Each of pixels $P_{N+2}$, $P_{N+3}$, $P_{N+4}$, $P_{N+5}$ and $P_{N+6}$ have a similar texel neighborhood. These texels may be used to determine the nearest neighbor for approximating the desired texel value. Also, as described above, interpolation may be performed on the texel neighborhood of each pixel. Assuming a linear memory in S, and memory access of a texel neighborhood in the order of (top-left, top-right, bottom-left, bottom-right), the memory transfers for the texels associated with pixels $P_N$, $P_{N+1}$, $P_{N+2}$, $P_{N+3}$, $P_{N+4}$, $P_{N+5}$ and $P_{N+6}$ may occur as shown in the following table (where the texture image size is W(width)× H(height), and the base address "B" of the texel array is at (L,M)):

| PIXEL | TEXEL | RAM LNR ADDR | DISTANCE (SKIP) |
|---|---|---|---|
| $P_N$ | (L, M + 1) | B + W | — |
|  | (L + 1, M + 1) | B + W + 1 | 1 |
|  | (L, M + 2) | B + 2W | W − 1 |
|  | (L + 1, M + 2) | B + 2W + 1 | 1 |
| $P_{N+1}$ | (L + 1, M) | B + 1 | −2W |
|  | (L + 2, M) | B + 2 | 1 |
|  | (L + 1, M + 1) | B + W + 1 | W − 1 |
|  | (L + 2, M + 1) | B + W + 2 | 1 |
| $P_{N+2}$ | (L + 2, M) | B + 2 | −W |
|  | (L + 3, M) | B + 3 | 1 |
|  | (L + 2, M + 1) | B + W + 2 | W − 1 |
|  | (L + 3, M + 1) | B + W + 3 | 1 |
| $P_{N+3}$ | (L, M + 3) | B + 3W | 2W − 3 |
|  | (L + 1, M + 3) | B + 3W + 1 | 1 |
|  | (L, M + 4) | B + 4W | W − 1 |
|  | (L + 1, M + 4) | B + 4W + 1 | 1 |
| $P_{N+4}$ | (L + 1, M + 2) | B + 2W + 1 | −2W |
|  | (L + 2, M + 2) | B + 2W + 2 | 1 |
|  | (L + 1, M + 3) | B + 3W + 1 | W − 1 |
|  | (L + 2, M + 3) | B + 3W + 2 | 1 |
| $P_{N+5}$ | (L + 2, M + 1) | B + W + 2 | −2W |
|  | (L + 3, M + 1) | B + W + 3 | 1 |
|  | (L + 2, M + 2) | B + 2W + 2 | W − 1 |
|  | (L + 3, M + 2) | B + 2W + 3 | 1 |
| $P_{N+6}$ | (L + 3, M + 1) | B + W + 3 | −W |
|  | (L + 4, M + 1) | B + W + 4 | 1 |
|  | (L + 3, M + 2) | B + 2W + 3 | W − 1 |
|  | (L + 4, M + 2) | B + 2W + 4 | 1 |

Associated with each of the pixels above ($P_N$–$P_{N+6}$) is a skip in the DRAM texel access of approximately the width of the texture image which is caused by the two-dimensional nature of the texel neighborhood. Even larger skips are introduced when the scan pattern crosses multiple integer coordinates in T for consecutive pixels. The speed of the texture mapping process may be significantly reduced by the performance of DRAM data transfers with frequent address skips of this nature.

Prior art texture mapping schemes attempt to overcome the limitations of DRAM data transfer characteristics by using a smaller, faster buffer memory to hold data between DRAM transfers. Buffering consists of loading a block of contiguous data into buffer memory for use by the processor performing the texel processing. A new block of data is loaded from DRAM into the buffer when it is needed.

FIG. 5 illustrates buffering applied to a texture image. In FIG. 5, texture image 500 has dimensions W×H, and base address 502. An N-byte buffer is used to hold N-byte buffered block 501 of texture image data having starting address M. Buffered block 501 is loaded as a linear block of texture image data from memory, or as a multidimensional tile of contiguous texture image data.

Buffering apparatus are illustrated in FIG. 6. DRAM 600 is coupled to N-byte buffer 601 to receive address information 604, and to transfer read data block 603 into the buffer memory. The data transferred from DRAM 600 comprises DRAM locations M through M+N, where M is supplied as read address 604. The N-byte contiguous block of data in buffer 601 is available via bus 605 for texel processing component 602 to access the texture image data in buffer 601. The texture image data is used to produce output 606, such as rendered pixels for display. When the texture image data required by the texel processing component 602 is not located in buffer 601, a new contiguous buffered block of texture image data is retrieved from DRAM 600 and placed in buffer 601.

Rather than performing the transfer of data as a single block to the buffer, the data may be streamed through the buffer, for example, in a FIFO (first in, first out) arrangement. The streaming data has an accessibility lifetime in the buffer based on the time required to shift a data element through the buffer and out. This lifetime is directly related to the size of the buffer itself.

If the buffered block 501 is configured as a contiguous one-dimensional (or linear) block of data, the buffered data is strongly biased along the S axis direction. Therefore, for two-dimensional graphics applications such as texel processing, buffered block 501 in buffer 601 requires frequent transfers from DRAM 600 to track texels when scan patterns produced by a particular mapping have a strong T component that causes frequent skips. Any performance gain achieved by storing a contiguous memory block in buffer 601 is countered by the need to make frequent data transfers of different blocks from DRAM 600 to buffer 601. Due to the contiguous nature of a buffer, a buffer needs to be very large to encompass large skips within the buffer, particularly for large images.

In the prior art, U.S. Pat. No. 5,548,709, issued to Hannah et al. on Aug. 20, 1996, discloses a semiconductor chip, referred to as TRAM (texture random access memory), that integrates texture memory, interpolation and resampling logic on the same substrate. Textures are input to the chip and stored in a main memory. The interpolator produces an output texel by interpolating from the textures stored in memory.

SUMMARY OF THE INVENTION

The invention provides for the cache organization of texture information and a method and apparatus for accessing the cached texture information and an index for said cached information. Texture image data (also called texels)

are represented in two dimensions (referred to as S-T coordinates). The texels are stored in memory (dynamic random access memory (DRAM), for example) in groups referred to as tiles. Cache is configured to contain multiple tiles of texture image data, each tile being stored as a line in the cache. Thus, a cache line can be multidimensional (e.g., two or three or more dimensions) and consists of data that is uniquely identifiable or may be viewed as an identifiable storage element in the cache. In one or more embodiments, the cache consists of a plurality of cache lines (or a plurality of storage elements uniquely identified by a tag (discussed below).

Because cache is smaller than DRAM, texel information stored in cache needs to be replaced as new texel information is accessed. In one embodiment, direct mapped cache is utilized wherein each DRAM location maps to a single cache line. Thus, there is only one location in cache for a given texel. However, multiple texels may map to the same cache line.

To determine whether and which texel is currently stored in cache, a tag is utilized. A tag table (also referred to as tag memory) contains the tag information for all tiles currently stored in cache. The tag information for a given texel contains addressing information regarding its location in DRAM. In one embodiment, a portion of the texel information is utilized as an index assigned to a specific cache line. Another portion of the tag information identifies the tile currently stored in cache. To exploit the 2D nature of texel information, a portion of the S bits and a portion of the T bits are utilized as the index and tile information. For example, in one embodiment, the middle S bits and middle T bits are utilized as the tag index. Additionally, the upper S bits and upper T bits are utilized to identify the tag currently in cache at the cache line specified by the tag index.

In one embodiment, the tags are organized into sections (referred to as tag banks) with the cache lines interleaved in two dimensions across the tag banks. Additionally, when mipmapping, the level of detail may be specified as part of the tag information.

According to one embodiment, to access information in cache, the low bits of S and T are examined to determine the appropriate tag bank. After locating the appropriate tag bank, the middle bits of S and T are examined to determine the index. The tag information at the specified index with the specified mipmap level of detail is then compared to the desired texel to determine if the tile containing the desired texel is in cache. If the tile is in cache, the low bits of S and T are utilized to access the appropriate texel and the information is read from cache. If the tile is not in cache, the tile is read from memory and written to the cache.

Cache access requests that are not currently active may be stored in a list or queue until they are completed. Due to the multidimensional nature of the cache memory and tag memory, the list of pending requests may be interleaved in a similar fashion. Such interleaving results in expedited comparison (between the pending requests and the corresponding cache line) and parallel processing of the pending cache request list.

By utilizing tags and interleaving the tags across memory, multiple tag memory accesses may be performed in parallel. Further, multiple cache memory accesses may be performed in parallel.

BRIEF DESCRIPTION OF THE DRAWINGS

FIG. 14A illustrates non-interleaved cache lines with tag banks.

FIG. 14B illustrates tag banks with interleaved cache lines according to one embodiment of the invention.

DETAILED DESCRIPTION OF THE INVENTION

The invention is a method and apparatus for the organization of cache and direct mapped cache. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

An embodiment of the invention overcomes the disadvantages of contiguous data buffering schemes of the prior art by providing a texture cache. The texture cache is a fast memory which may store one or more tiles of a texture image as individual, independently addressable cache lines. A cache line can be multidimensional (e.g., two or three or more dimensions) and consists of data that is uniquely identifiable or may be viewed as an identifiable storage element in the cache. In one or more embodiments, the cache consists of a plurality of cache lines (or a plurality of storage elements uniquely identified by a tag (discussed below). The tiles stored in the cache lines of a texture cache may be loaded from non-contiguous locations of a texture image to permit greater freedom in the configuration of texture data storage and access, and thus greater storage efficiency within the fast memory forming the texture cache. A graphical system in a computer environment may access the texture image data in main memory or graphics memory via the texture cache.

The limitations associated with prior art buffering systems that use contiguous buffered blocks of data are avoided by permitting multiple non-contiguous tiles of data to be stored in the fast cache memory. Two-dimensional and discontinuous scan patterns are better supported by a two-dimensional internal configuration of the tiles stored in the cache. The resulting texel access of texture image data is more flexible and better attuned to graphical applications than prior art buffering schemes. Additionally, the tag information expedites the access speed to the cache.

Figure 1A:
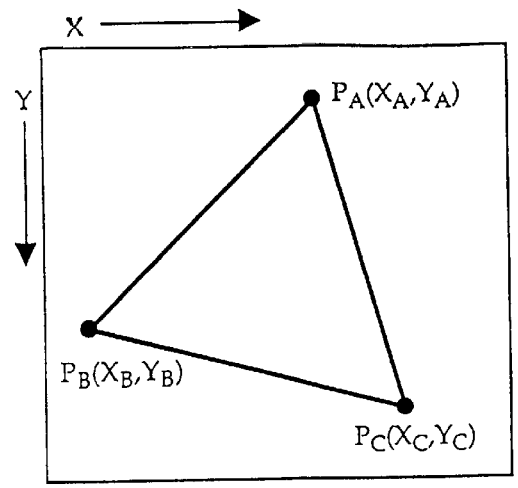
FIG. 1A illustrates a primitive in an X,Y image space.
Figure 1B:
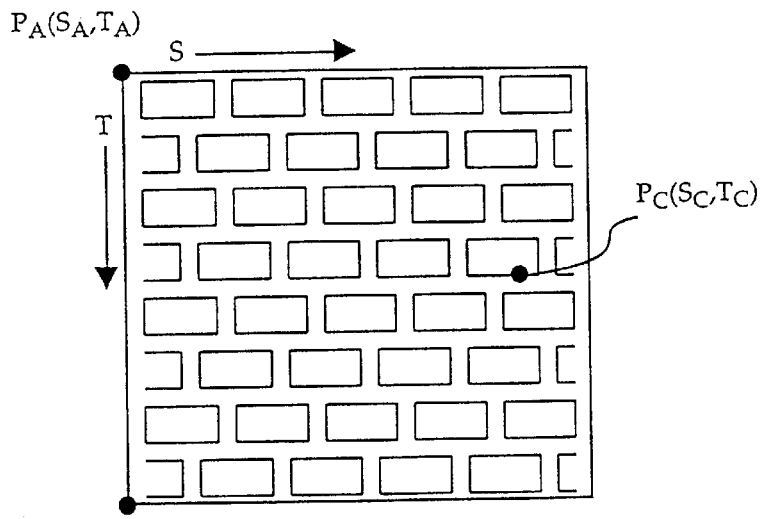
FIG. 1B illustrates a texture image in an S,T texture space.
Figure 1C:
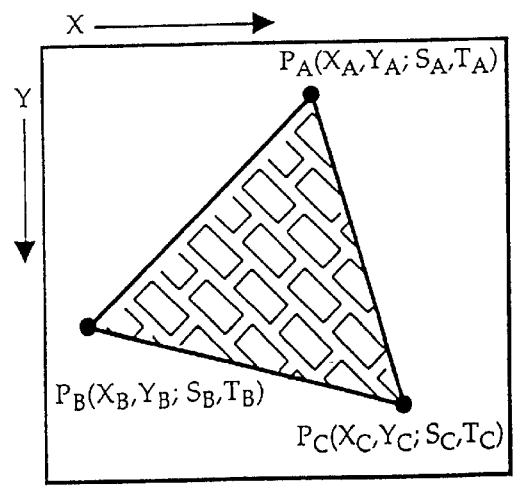
FIG. 1C illustrates a mapping of the texture image of FIG. 1B into the primitive of FIG. 1A.
Figure 4:
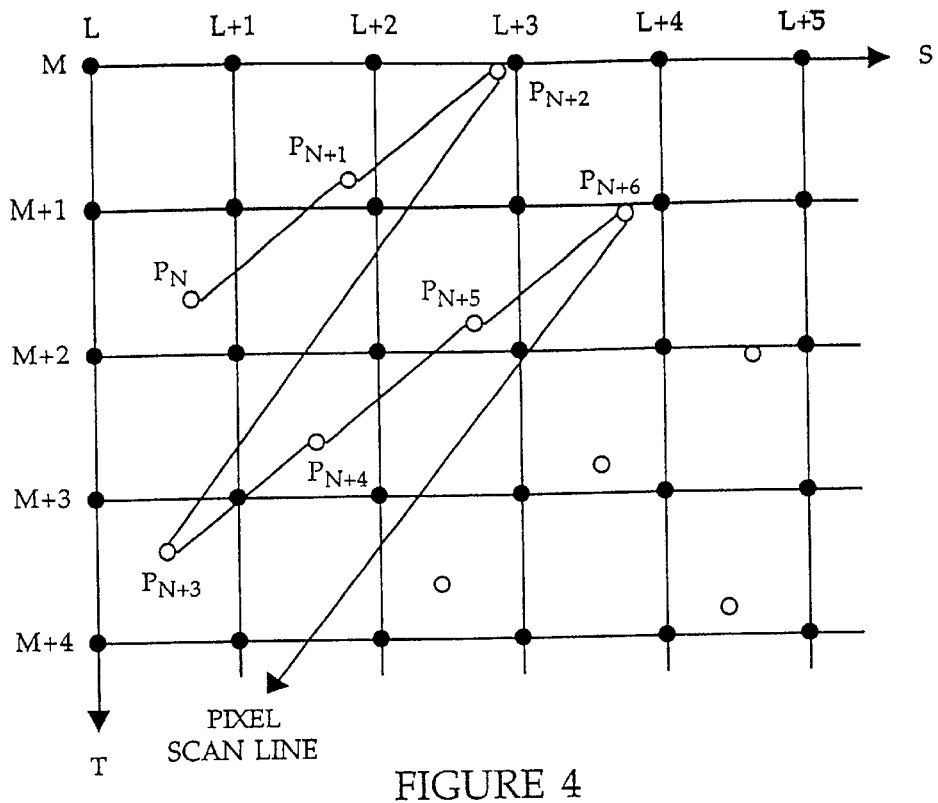
FIG. 4 is an example of a pixel scan line traversing a texel array in texture space.
Figure 2:
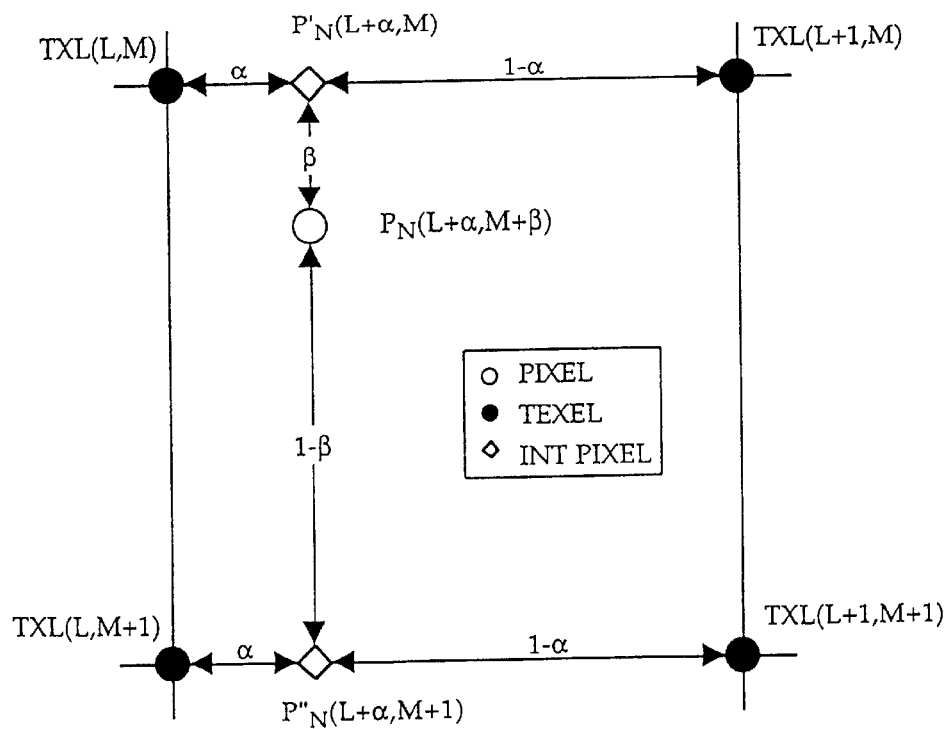
FIG. 2 is a diagram illustrating bilinear interpolation in texture space.
Figure 3:
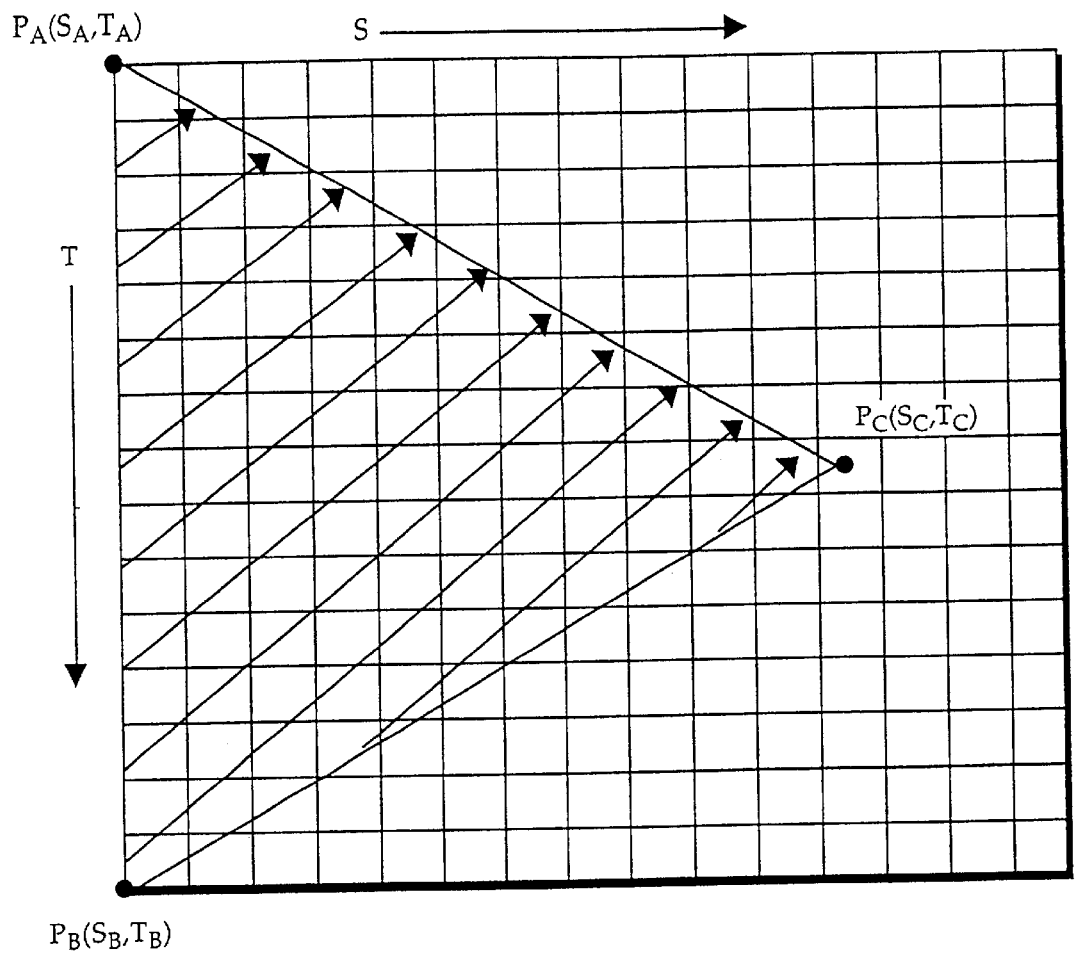
FIG. 3 illustrates the texture space scan pattern of the texture image of FIG. 1B when a scan is performed along the X axis in image space.
Figure 5:
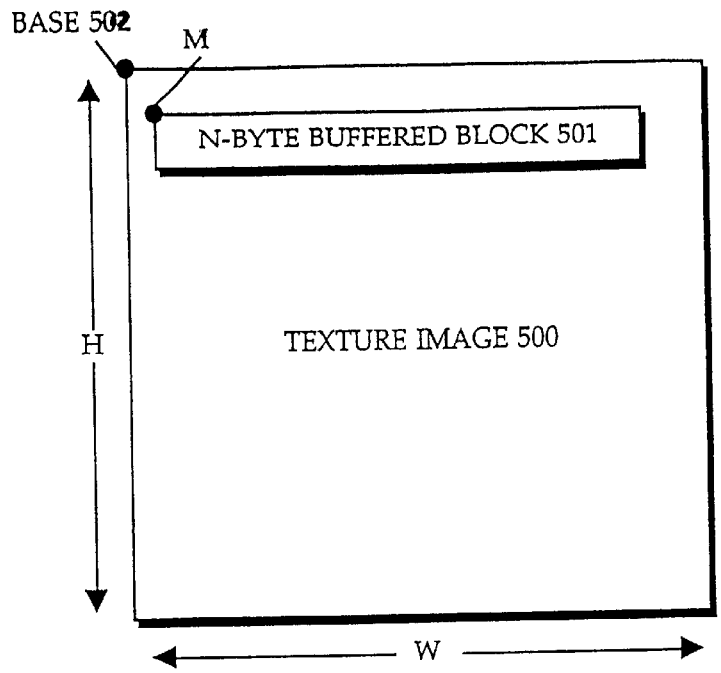
FIG. 5 is a diagram illustrating buffering of a texture image.
Figure 6:
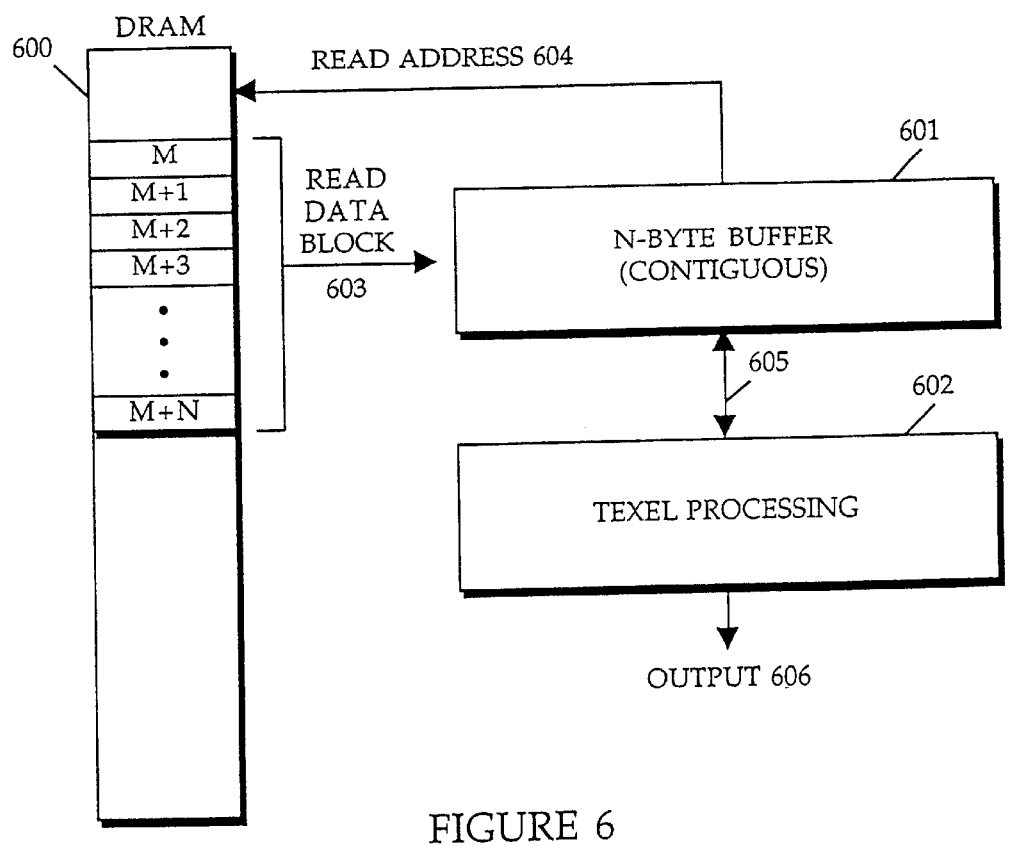
FIG. 6 is a block diagram of a texture image buffering apparatus.
Figure 7:
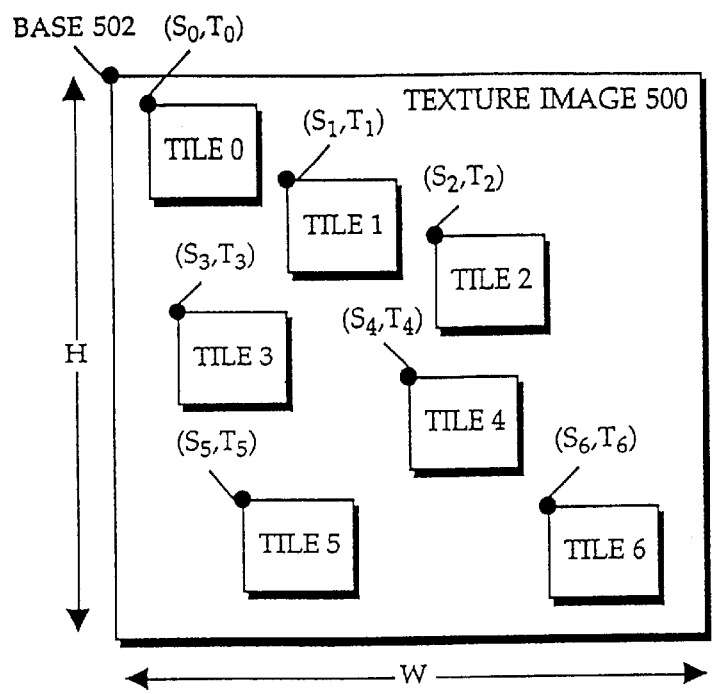
FIG. 7 is a diagram illustrating caching of a texture image in accordance with an embodiment of the invention.

FIG. 7 illustrates the use of a tiled caching scheme within the framework of a two-dimensional texture image 500. Texture image 500 has a size in tiles of W×H. Base address 502 of texture image 500 is the address location where the image data (i.e., texels) begins in DRAM. In the example of FIG. 7, seven tiles (0–6) of image data are stored in a texture cache. Tile 0 comprises a tile location at S and T coordinates $(S_0,T_0)$ with respect to base address 502. Tile 1, tile 2, tile 3, tile 4, tile 5 and tile 6 comprise tile locations $(S_1,T_1)$, $(S_2,T_2)$, $(S_3,T_3)$, $(S_4,T_4)$, $(S_5,T_5)$ and $(S_6,T_6)$, respectively. Each tile comprises a two-dimensional array of texels extending a first number of texels in the S direction and a second number of texels in the T direction.

The organization of cached tiles 0–6 in texture image 500 may be contiguous in an arbitrary two-dimensional arrangement, or the tiles may be dispersed throughout the texture image as needed for a particular scanning pattern. Tile regions of texture image 500 are not stored in the cache unless utilized in a particular texture mapping operation. More efficient use of fast data storage resources (i.e., cache memory) is thus provided than in buffering systems where, due to the large, contiguous nature of the buffer, portions of buffered data may never be utilized.

Figure 8A:
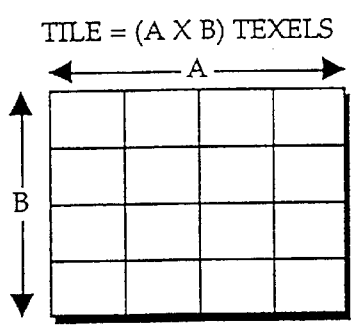
FIGS. 8A–8D are diagrams of texel tiles in accordance with an embodiment of the invention.

FIG. 8A illustrates a generalized tile for use in accordance with an embodiment of the invention. The tile comprises an array of texels of width A and height B. A more square arrangement, where A≈B, is preferred in order to optimize the two-dimensional aspect of the tile along each axis. Texture image 500 may be apportioned into a framework of tiles, any number and configuration of which may be stored in the texture cache, up to the cache limit.

Figure 8C:
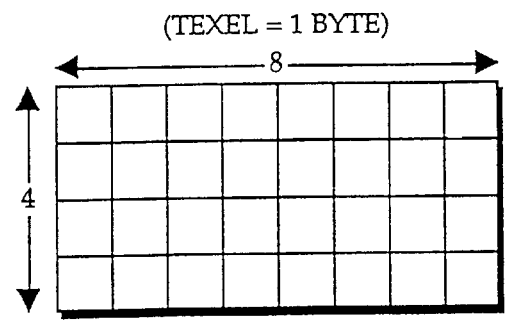
Figure 8B:
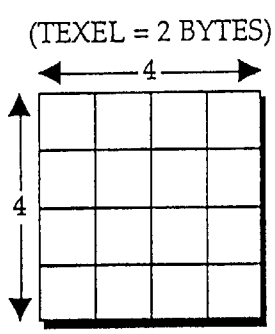
Figure 8D:
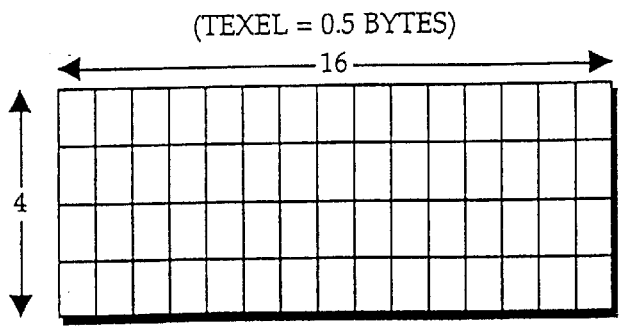

Assuming a fixed cache line size, the sizes of A and/or B may vary based on the number of bits or bytes per texel. This is illustrated in FIGS. 8B, 8C and 8D, which show a tile for use with a cache having a fixed cache line, and thus fixed tile size, of thirty-two bytes. The width value A is modified to accommodate the various texel sizes in the illustrated embodiment. FIG. 8B assumes a texel size of two bytes per texel; FIG. 8C assumes one byte per texel; and FIG. 8D assumes 0.5 bytes, or four bits, per texel.

In FIG. 8B, the tile dimensions are optimally four by four texels, for a total of sixteen texels of two bytes each. Other arrays of sixteen texels may also be implemented in other embodiments, such as two by eight or eight by two. One by sixteen or sixteen by one are possible tile arrangements, as well, but do not provide the advantages of a two dimensional tile.

In FIG. 8C, the tile dimensions are eight by four texels, for a total of thirty-two texels of one byte each. Similar to FIG. 8B, other arrays of thirty-two texels may also be implemented in other embodiments.

In FIG. 8D, the tile dimensions are sixteen by four texels, for a total of sixty-four texels of four bits each. Other embodiments may implement a different array organization totaling sixty-four texels. However, because data is often accessed in byte-wise fashion, the width A of the tile array will typically have a minimum of two texels to form a complete byte.

Figure 9:
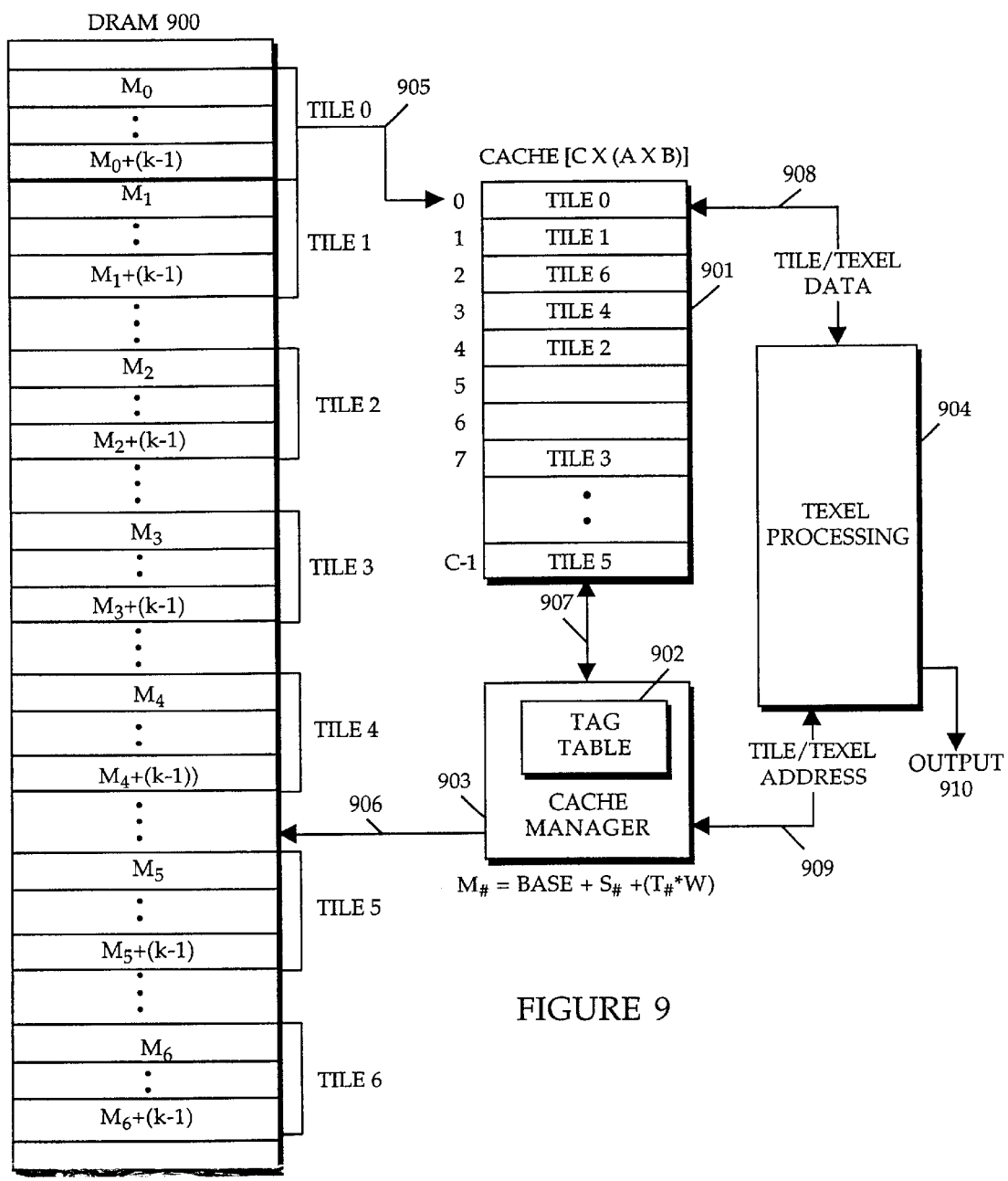
FIG. 9 is a block diagram of a texture caching apparatus in accordance with an embodiment of the invention.

An embodiment of texture caching apparatus is illustrated in FIG. 9. The apparatus comprise a DRAM memory 900, cache memory 901, tag table 902, cache manager 903, and texel processing component 904. Texture image data is transferred between DRAM 900 and cache 901 in the form of tiles the size of a single cache line (i.e., addressable cache location). Individual texels (or complete tiles in other embodiments) are read from cache 901 by texel processing component 904. Cache manager 903 receives texel requests (e.g., texel addresses in S and T coordinates) from texel processing component 904, and triggers the transfer of the appropriate texel (or tile) from cache 901. Cache manager 903 also coordinates data transfers between DRAM 900 and cache 901 in accordance with a given cache replacement policy. Tag table 902 is used by cache manager 903 to track which tiles are located in which cache lines of cache 901.

Texel processing component 904 is part of a graphics processing subsystem responsible for texture mapping. Texel processing component 904 is coupled to cache manager 903 via bus 909 to exchange requests for image data in the form of texels. For example, each request may include texel address information in S and T coordinates. Output 910, in the form of rendered pixels, for example, is generated from texel processing component 904 to be placed in a frame buffer for display, or to be further processed by the graphics subsystem.

DRAM 900 is illustrated as a memory device containing a sequence of data words. For example, DRAM 900 may be configured to store and transmit texture image data in complete tiles, or portions thereof, as a single addressable DRAM word or a sequence of consecutive words. In other embodiments, DRAM 900 may be structured in multiple banks, with addressability in more than one dimension. Embodiments of the invention have application to any DRAM configuration. Further, embodiments of the invention are applicable to any type of memory. DRAM 900 may be, for example, the main memory of a computer system, a mass storage device, special purpose graphics memory, or any other type and configuration of memory in which texture data may be stored.

The arrangement of texture data in DRAM 900 may vary among different embodiments. Typically, the texture caching apparatus transforms S and T texture coordinates specified by texel processing component 904 into one or more appropriate DRAM addresses for the tile containing the specified texel. For S and T values in terms of tiles, the S and T values of a constituent texel may be individually processed in an integer division function (DIV) based on the row and column dimensions of a tile. For a tile configuration of A×B texels, the tile-based S and T coordinates in texture space for a given tile are:

$$S_{TILE} = S_{TEXEL} \text{ DIV } A;$$

and $$T_{TILE} = T_{TEXEL} \text{ DIV } B$$

For many cases, A and B are powers of two (e.g., 1, 2, 4, 8, 16, etc.), and the DIV function may be performed in hardware with binary shifts or hardwired selection of appropriate upper bits in S and T. From the tile-based S and T coordinates, the DRAM address (or addresses) of the tile is determined from the mapping of the tiles into DRAM 900.

For example, in FIG. 9, texture image 500 is stored in DRAM 900 as a sequence of tiles in S, with traversals of one unit in the T direction comprising a skip of W (the width of the texture image) address locations, scaled by the number of DRAM words per tile. For FIG. 9, W and H represent the dimensions of the stored texture image in terms of tiles. For tile 0 having a tile location ($S_0, T_0$) in texture space (tile-based), the memory location in DRAM for the first texel is:

$$M_0 = BASE + k[S_0 + (T_0 * W)]$$

where BASE is the base address of the given texture image in DRAM 900, and "k" is the number of DRAM words forming a single tile. To load a given cache line with tile 0, DRAM addresses $M_0$ through $M_0+(k-1)$ are accessed and transmitted together as a tile to cache 901 to be stored as a cache line, such as shown by arrow 905 pointing to tile 0 at cache location 0. For the case where k=1 (i.e., a single DRAM word stores a complete tile), the address of tile 0 is simply $M_0$. Other mappings of tiles into DRAM (e.g., other than as a sequence in S) may be used in other embodiments.

Cache 901 is a fast memory having C addressable cache words (e.g., 0 through C−1), referred to as cache lines. Each cache line supports a tile of image data. The footprint of the cache (i.e., the total amount of data from the DRAM that may be stored in the cache) is therefore C×"tile size" in expanse, though the footprint may be dispersed across a texture image in "tile size" pieces. The ability to freely configure the tiles in the cache provides for much greater storage and re-use efficiency than that provided by a buffer that has the same sized footprint.

In a general caching scheme, any tile may be stored at any cache location, and the same tile may be stored in different cache locations at different points in time. As shown, locations 0–4 contain tiles 0, 1, 6, 4 and 2, respectively, and location C−1 contains tile 5. Cache manager 903 determines how cache lines are written into and read from cache 901, in accordance with a given caching scheme. A cache address is specified over bus 907 and a transfer is made between the specified cache line and either DRAM 900 or texel processing component 904 as appropriate.

For transfers of data from cache 901 to texel processing component 904 via data bus 908, a complete tile may be transferred and the desired texel extracted by texel processing component 904, or S and T address bits may be provided to cache manager 903 to resolve the correct texel from the selected tile via multiplexing performed on the cache port shared by texel processing component 904. Cache 901 may be implemented in banks (e.g., each bank used to store a corresponding texel of each cache line) to simplify this multiplexing operation by extracting the addressed texel directly from its cache line at the port of the corresponding bank.

For a tile of dimensions A×B texels, given an embodiment in which tiles are internally organized as a sequence of texels in S, a tile in a cache line can be resolved into respective texels as follows. After locating the respective tile (e.g., tile 0 of location $M_0$) in cache 901, the relative texel S and T coordinates of the desired texel are determined by performing an integer modulo (MOD) operation on the S and T texel coordinates:

$$S_{REL} = S_{TEXEL} \text{ MOD } A;$$

and $$T_{REL} = T_{TEXEL} \text{ MOD } B$$

For powers of two, those modulo operations may be performed by simply taking the lower bits of the original S and T texel coordinates. I.e., for A=4 and B=8, the relative coordinates comprise the lower two significant bits of the S coordinate and the lower three bits of the T coordinate. For the cache line arranged as a linear sequence of texels in S, the address of the desired texel within the cache line is:

$$M_{TEXEL} = S_{REL} + (A * T_{REL})$$

For embodiments in which the cache is constructed of banks, those banks may be configured in a multi-dimensional manner to facilitate individual texel addressing directly from the relative texel coordinates.

To track which tiles are located in cache 901, and at which locations, tag table 902 is utilized to store a tag for each tile in the cache. Each tag is associated with a particular location in the cache, and may be used to identify the tile currently stored therein. In some embodiments, the tag comprises the address of the stored tile (or one or more of its texels) in DRAM or in texture space (i.e., in S and T), or some portion thereof. When a cache request is received from texel processing component 904 in the form of an address transmitted via bus 909, cache manager 903 determines the appropriate tag from the specified address and compares the determined tag with the tags stored in the tag table.

If there is no matching tag in tag table 902, the request is termed a cache "miss," meaning that the tile containing the requested texel must be loaded into cache 901 from DRAM 900. Which existing cache line is to be overwritten by the desired tile is determined by cache manager 903 in accordance with a given replacement policy. Once the tile is loaded, tag table 902 is updated, and the texel or tile is transferred from cache 901 to texel processing component 904. If there is a matching tag in tag table 902, it is termed a cache "hit," and the texel may be transferred from the tile associated with the matching tag. Tags are discussed in detail below.

Cache manager 903 may be used to perform addressing transformations, such as those described with respect to tile addressing in DRAM 900 and texel addressing in cache 901, based on S and T coordinates. Any memory configuration details, such as banking, may be handled by such transformations within the cache manager. This allows texel processing component 904 to perform all texel operations with reference to texture space.

Cache Tags

Figure 15:
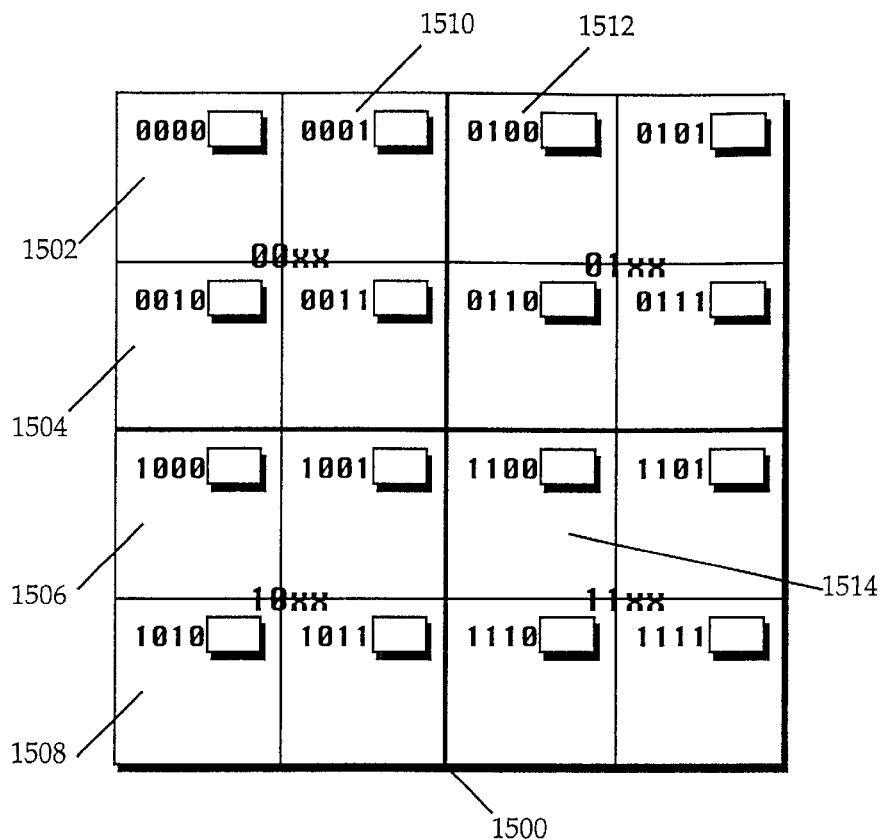
FIG. 15 illustrates tiles and texel information and their relation to cache lines.
Figure 15:
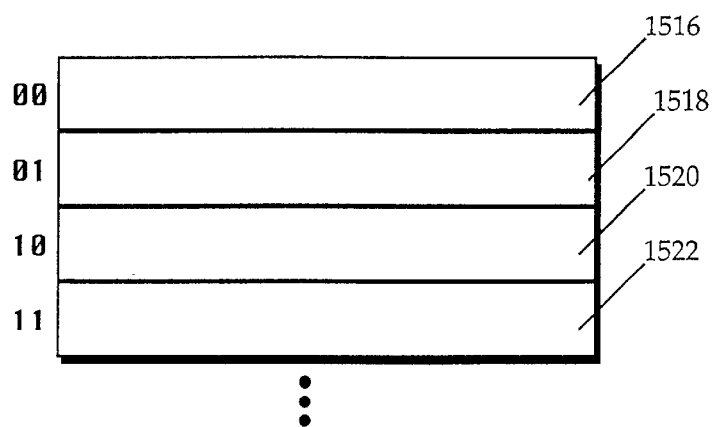

The cache of the invention is not as large as the texture document. Additionally, the cache size limits the number of address bits that may be stored in the cache that determine which DRAM information is stored within the cache. Referring to FIG. 15, each box of FIG. 15 may be viewed as a tile or texel (e.g., tiles 1502–1514) contained within DRAM 1500. The address of each tile differs by the most significant bits of the address. For example, DRAM 1500 may be divided into four sections (a quad) and each quad may be further divided. Each section may contain one or more tiles or texels. As the DRAM 1500 is divided into smaller sections, the divisions may be differentiated by the address bits. For example, the tiles or texels within section 00xx differ from the tiles or texels in section 01xx by the most significant bits (00 v. 01). An address identifies each texel with the most significant bits identifying the particular tile that the texel is located within.

Due to the above constraints, the tiles and texels stored in the cache may need to be removed and replaced with new tiles or texels. The manner in which the cache tiles are replaced is determined according to a cache replacement policy.

One prior art cache replacement policy consists of replacing the least recently used item in cache with the new item. Another prior art replacement policy determines which elements in the cache are the least frequently used and replaces the least frequently used cached items with the new item.

One embodiment of the present invention provides for direct mapped cache. With direct mapped cache, every S-T DRAM coordinate is mapped to a specific location in cache referred to as a cache line using some portion of the DRAM coordinates. Only one location in cache exists for a given texel or tile. But, since the cache is smaller than the DRAM, more than one texel or tile may map to the same location in cache. Accordingly, at one given time, one of several tiles or texels may be present in a specific cache line. Referring to FIG. 15, cache lines 1516–1522 each contain a tile from DRAM 1510. Depending on which bits are utilized to determine the specific cache line, many tiles may fall within each cache line. For example, if the least significant bits are utilized as an index for each cache line, tiles 1502, 1506, 1512, and 1514 may all map to cache line 1516 based on the least significant bits xx00. Due to size constraints, the cache may not contain complete address information for each tile. Consequently, the address information for cache line 1516 may only contain the index bits 00. To differentiate the tiles and determine which tile is in the cache, the upper bits may then be utilized. For example, tiles 1502, 1506, 1512, and 1514 all have differing upper bits, namely, 00, 10, 01, and 11, respectively which may be stored separately from the cache to indicate which tile is currently in the cache.

Figure 11:
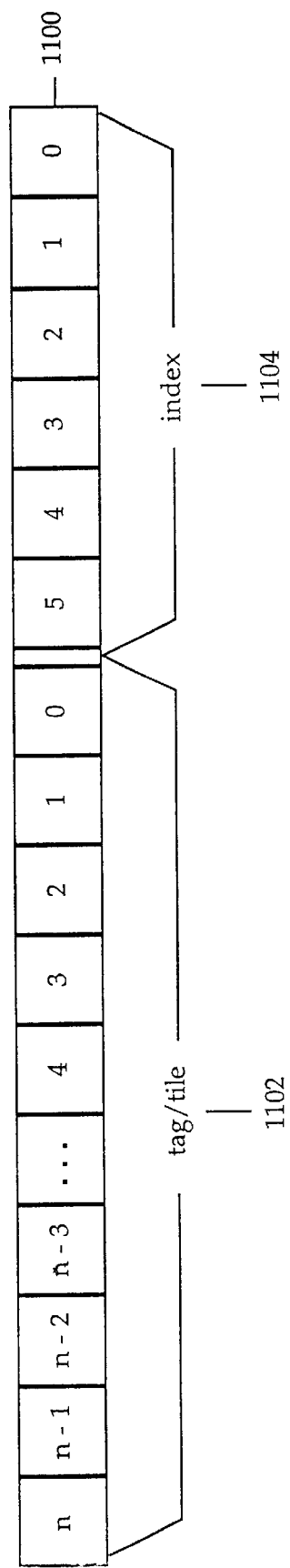
FIG. 11 illustrates the tag information for a texel according to one embodiment of the invention.

A cache tag identifies the DRAM location that a tile or texel currently in cache originated from. Cache tags may be stored in a table of cache tags, an array, or other format, and are referred to as tagrams. Such a table of tagrams may be referred to as tag memory (the memory containing the tags). Specific portions of the tag identify specific aspects of the texel or tile in cache. The tag index portion of the tag is obtained from the tile/texel information and identifies the specific cache line that that tile/texel is mapped to. For example, in one embodiment of the invention, as described above, the tag index is comprised of the middle bits of the texel. In one embodiment, another portion of the tag identifies the tile that the texel is located in (e.g., the upper bits as described above). Referring to FIG. 11, tag 1100 is comprised of the tag index 1104 and tag or tile information 1102. Bits 0–5 of tag 1100 are the index of a texel and identify the cache line where tile 1102 is stored in the cache. Thus, tag tile 1102 identifies the tile currently stored in the cache. Index 1104 and tag tile 1102 may constitute the entire tag for a given texel. In such an embodiment, the lower bits of texel information may identify the specific texel in the cache line. However, in an embodiment where the tile consists of one texel only, then tile 1102 identifies the specific texel currently in cache. In the above embodiment, since the index is based on the middle bits of a texel, those texels with similar middle bits will map to the same cache location.

Figure 13:
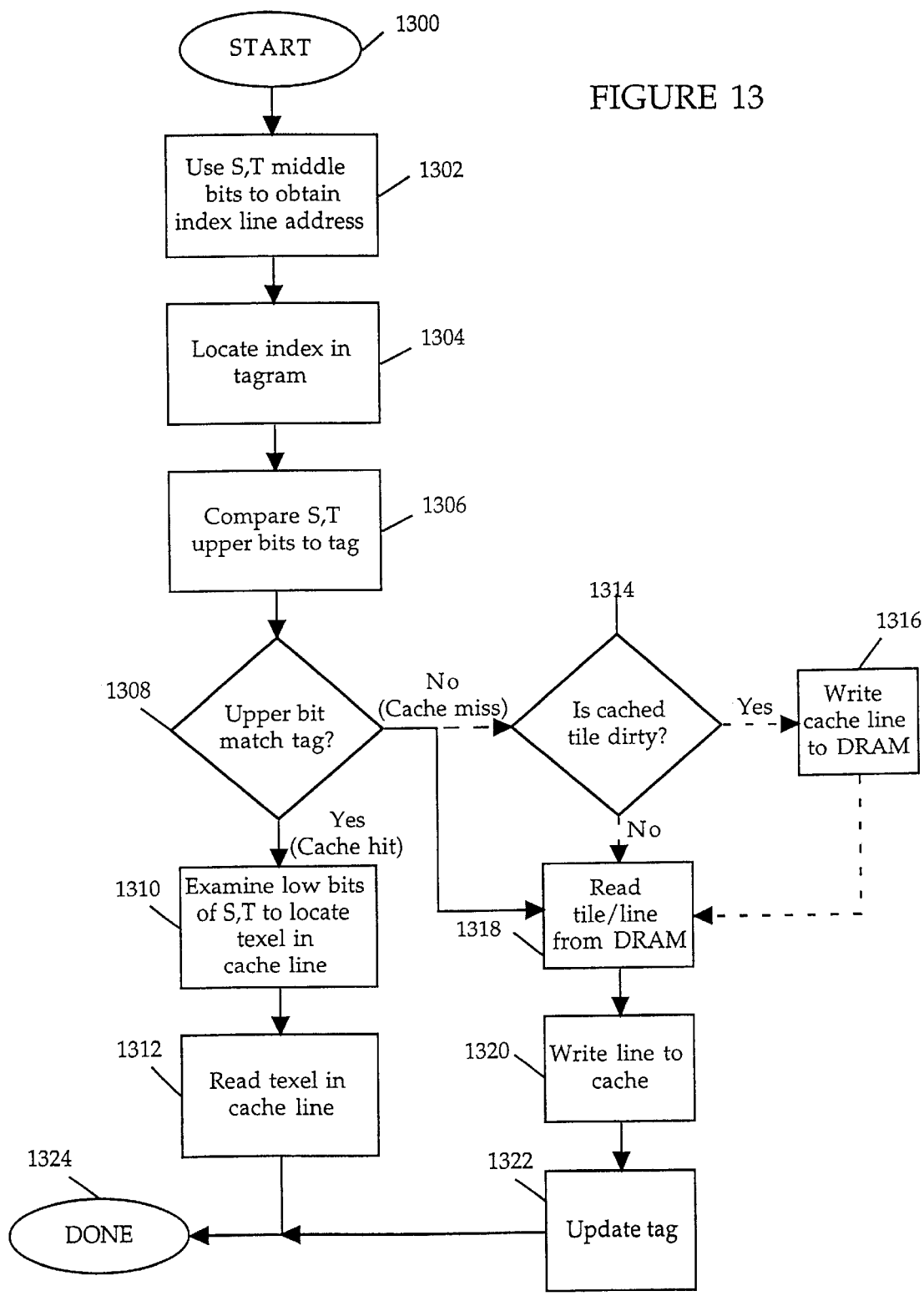
FIG. 13 demonstrates a method for utilizing cache according to one embodiment of the invention.

FIG. 13 demonstrates the utilization of cache according to one embodiment of the invention. The method begins at step 1300. At step 1302, the middle bits of the texel are utilized to calculate and obtain the index. At step 1304, the tagram is examined and the index is located in the tagram (to identify whether the texel is currently in cache). At step 1306, the upper bits of the texel are compared to the tag tile. At step 1308, a determination is made regarding whether the upper texel bits match the tag tile. If the upper bits match, then the tile containing the texel is currently in cache, referred to as a cache hit. If the upper bits do not match, the tile containing the texel is not in cache, referred to as a cache miss. If a cache miss occurs, the tile is read from DRAM at step 1318. At step 1320, the tile is written in the cache. At step 1322, the tag is updated to reflect the tile information currently in cache. In an alternate embodiment in which cache write backs occur, if a cache miss occurs, the tile that is currently in the cache is examined to determine if any changes made to the tile have been updated in the DRAM (i.e., the cached tile is dirty) at step 1314. If the changes have not been updated, the cache line containing the tile is written to DRAM (thereby updating the DRAM) at step 1316.

If a cache hit is determined at step 1308, the low bits of the texel are examined to locate the specific texel in the cache line at step 1310 (a cache line may contain a tile which contains one or more texels). At step 1312, the texel in the cache line is read. The process is complete at step 1324.

In the above example, the tag identifies whether a tile containing the texel is currently in cache at steps 1300–1308. If the texel is not in the cache, it is read from DRAM, written to the cache, and the tag is updated at steps 1314–1322. If the texel is in the cache, the relevant information is read directly from cache at steps 1310–1312.

Figure 12A:
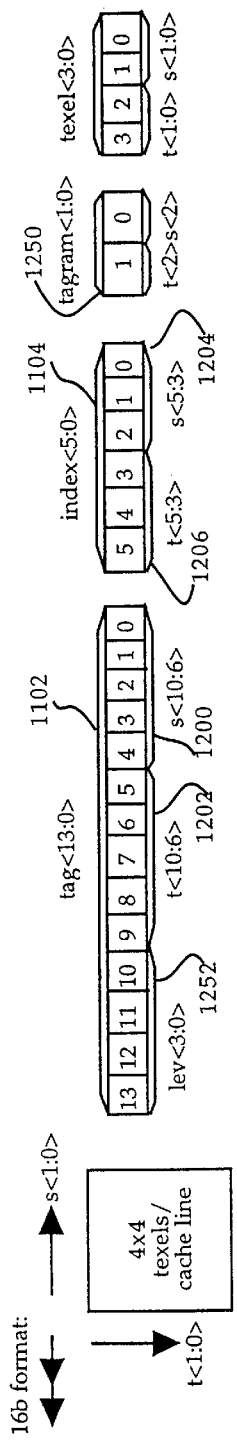
FIG. 12A illustrates the tag information for a 16-bit texel according to one embodiment of the invention.
Figure 12B:
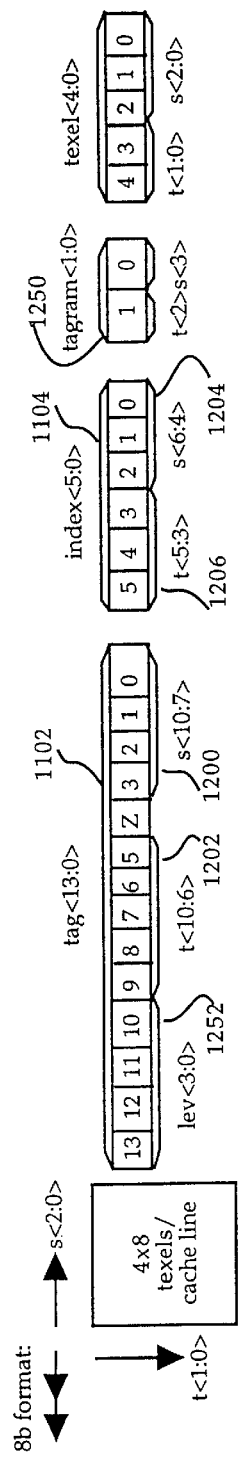
FIG. 12B illustrates the tag information for a 8-bit texel according to one embodiment of the invention.
Figure 12C:
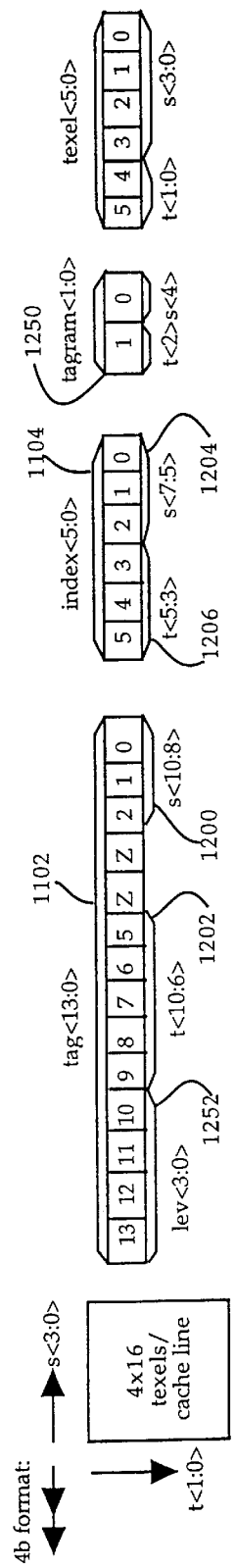
FIG. 12C illustrates the tag information for a 4-bit texel according to one embodiment of the invention.

To exploit the 2D nature of graphics and texels, one embodiment of the invention utilizes the S-T coordinates as tag information. For example, referring to FIGS. 12A–12C, index 1104 is made up of a portion of the middle S bits and a portion of the middle T bits. FIG. 12A demonstrates a tagram when 16 bits are utilized to contain the relevant texel information. FIG. 12B demonstrates a tagram when 8 bits are utilized to contain the relevant texel information. FIG. 12C demonstrates a tagram when 4 bits are utilized to contain the relevant texel information.

In FIGS. 12A, 12B, and 12C, bits 3–5 of T and varying bits of S are utilized as the tag index 1104. Further, the tile that contains the desired texel is identified in the tagram based on a portion of S bits and a portion of T bits. FIG. 12A demonstrates a tagram with bits 6–10 of S 1200 and bits 6–10 of T 1202 as the tag tile 1102. Similarly, FIG. 12B demonstrates a tagram with bits 7–10 of S 1200 and bits 6–10 of T 1202 as the tag tile 1102. FIG. 12C demonstrates a tagram with bits 8–10 of S 1200 and bits 6–10 of T 1202 as the tag tile 1102. Thus, FIGS. 12A–12C illustrate the use of the S-T coordinates to access and locate items in the cache.

In one embodiment, multiple cache sets are utilized. With multiple cache sets, texels with the same index may be present in the cache simultaneously (in different cache sets). For example, texel A with an index of 011011 may be in cache set X and texel B with the same index of 011011 may be in cache set Y. When two cache sets are utilized, the cache is commonly referred to as two-way associative cache. Any number of sets may be utilized for the cache information. In one embodiment, the texels are interleaved across sets and banks (discussed below) or memory ports (e.g., a multiport RAM) within the cache lines. For example, every 2×2 texel may be interleaved across four sets and then interleaved across four banks within each set.

Additionally, a set associative cache may be utilized in which multiple tiles or texels are stored in the same cache line. In such a situation, the tag tile information will contain the relevant information for each tile stored in the cache line.

Tag Banks

It is desirable to access texel information and tag information more than one texel and tag at a time (per clock cycle). For example, when bilinear filtering, one pixel can access up to 4 (2×2) surrounding texels and therefore can touch up to 4 (2×2) cache lines (one cache line per texel) (and multiple tags (with one tag per cache line)) per clock cycle. Trilinear mipmapping of 4 (2×2) pixels is done by bilinear filtering 4 (2×2) pixels per clock cycle over two clock cycles. When trilinear filtering, the maximum distance between pixels in texture space is less than two which guarantees that a quad of pixels can still only touch up to 2×2 cache lines per clock cycle. It is desirable to check each of the 4 tags and 4 cache lines in one clock cycle.

To access multiple tags and cache lines in one clock cycle, one embodiment of the invention provides for the organization of the tagram into multiple sections (referred to as banks or ports) with the cache lines interleaved in two dimensions across the tagram banks to guarantee than any 4 (2×2) cache lines will not access the same tagram twice. Further, the cache lines may be organized in multiple banks that correspond to the tag banks. Alternatively, one bank can be utilized and the memory accesses can be superclocked (i.e., when multiple clock cycles are performed serially and appear as if the accesses are performed serially).

Referring to FIG. 14A, each box represents a cache line. Each cache line (which may be accessed using the tag index for each cache line) is linearly interleaved across tag banks identified by the numbers 0–3. For example, as described above, when accessing one pixel, four (4) texels may be accessed for the purposes of bilinear and trilinear interpolation. Consequently, the 0–3 banks represent the four texels with the texel image coordinates interleaved across the cache banks to enable parallel cache line access. The texel image coordinates may be two dimensional, or three or more dimensional.

Neighboring texels may be utilized to render a pixel, and when mipmapping, texels must be located within a close proximity to optimize the resolution. The texels being accessed may be located within one tile. However, the texels may also be distributed across multiple tiles (with each tile stored in a separate cache line and related cache bank). For example, the relevant texels may lie in tiles 1400–1406. Without interleaving the cache lines through tag banks in two dimensional space, the same tag banks (tag banks 1 and 2 for example) may store the relevant cache lines 1400–1406. Consequently, the relevant information cannot be retrieved in one clock cycle. Similarly, if the cache banks contain closely related cache lines (e.g., cache lines for similar texture image coordinates), the cache lines containing related texels cannot be retrieved in one clock cycle.

As described, for each pixel, there is a multi-dimensional address pattern of texels in a neighborhood that may be used for filtering the pixel. Filtering may consist of a weighted sum of a multidimensional neighborhood of samples (i.e., texels) that are applied to the texel that corresponds to a specific pixel. The neighborhood may be multidimensional by utilizing texel coordinates and a level of detail in mipmapping, for example. To determine the neighborhood, a neighborhood operation (also referred to as a filter extent or file width) may be utilized which identifies texels that are located in close proximity (or within a predefined neighborhood of texels) of a pixel. The neighborhood operation may consist of an arithmetic or logical operation on the image sample values such as comparisons, minimums, and maximums. Further, because the neighborhood of texels are adjacent, contiguous or located in close proximity, the texels in the neighborhood can be accessed in parallel across cache memory banks and tag banks by interleaving. For example, when bilinear filtering is utilized, the four (4) texels at the odd and even texel address will be accessed which can be performed in parallel across cache memory banks (e.g., the neighboring pixels can fall in different cache lines with the location of the cache lines interleaved across cache memory banks) and tag memory banks. Thus, since a filter operates on a contiguous multidimensional region/neighborhood, for a neighborhood of a known size, the cache tags may be organized such that all texels of the multidimensional neighborhood can reference the tag memory simultaneously and all texels in cache memory and all texels from the neighborhood can be accessed simultaneously in cache memory (using different cache lines with different tags).

Referring to FIG. 14B, the cache lines are distributed in two dimensions over the tag banks. In FIG. 14B, if the relevant texels lie in tiles 1410–1416, four different tag banks contain the relevant information. Consequently, the relevant texel information may be retrieved in one clock cycle. Similarly, the cache lines in the cache memory are interleaved across the cache banks and may be accessed in parallel in one clock cycle. Further, the cache line texture image coordinates may be two, or three or more dimensional.

If tag banks or tag sets and cache banks or cache sets are utilized, a portion of S bits and a portion of T bits specify the bank and/or set in cache that the texel information is stored in. Referring again to FIGS. 12A–12C, tagram information 1250 may be utilized to specify the tag bank that the texel is located in. In FIG. 12A, bit 2 of S and bit 2 of T is utilized to specify the bank. In FIG. 12B, bit 3 of S and bit 2 of T is utilized to specify the bank. Referring to FIG. 13, when banks are utilized, the cache lookup operation is substantially similar but for minor differences in steps 1302 and 1304. At step 1302, the middle bits are utilized to obtain the index line address and appropriate tag bank. At step 1304, the index within that bank is located in the tagram.

In addition to specifying the bank where a texel is stored, when mipmapping, the level of detail (as discussed above) for the desired tile may be specified as part of the tag information. For example, level 1252 in FIGS. 12A–12C specifies the mipmap level of detail that contains the tile specified in the tag tile information 1102.

Referring to FIG. 12A, when texel information is requested, bit 2 of S and bit 2 of T are examined to determine the appropriate tag bank to look in. After locating the appropriate tag bank, bits 3–5 of S and bits 3–5 of T are examined to determine the index in the appropriate tag bank. After locating the index in the tag table, bits 6–10 of S and 6–10 of T are utilized to determine if the tile containing the desired texel is currently in cache for the desired mipmap level. If the desired tile is in cache, the index provides the cache line and cache bank and bits 0–1 of S and 0–1 of T specify the location within the cache line where the desired texel information is located. Once located, the texel information may then be accessed. Such information may also be retrieved for multiple tiles in parallel as a result of the cache bank interleaving. If the tile containing the desired texel is not currently in cache, the information is read from DRAM. Bits 3–5 of S and bits 3–5 of T are then utilized to locate the appropriate cache line. The information is then read from DRAM into cache (in one or more alternate embodiments, if the cache line was dirty as described above, the dirty cache line is first written to the appropriate DRAM location prior to reading the new information from DRAM into cache).

The bits specified in connection with FIG. 12A are utilized when the texel information is 16 bits long. FIGS.

12B and 12C specify the bits that are utilized when the texel information is 8 bits and 4 bits respectively.

In addition to performing cache memory accesses and tag memory accesses in parallel, one or more embodiments provide for multiple accesses to be performed sequentially. The different neighborhoods, different image levels, different images, and different image dimensions may be accessed sequentially with the results accumulated. For example, with mipmapping, trilinear interpolation, and multi-texturing, the neighborhood operation is performed in parallel to the texels, the results are stored, and the operation is performed again to something else (i.e., another level of detail), and then the results from the two processes are accumulated. Thus, the multi-dimensional aspect of the cache memory and tag memory may be accessed sequentially and accumulated while the individual accesses at each dimension (e.g., level of detail when mipmapping) are still performed in parallel. Thus, while some parallelism in the accesses is maintained, to perform all of the accesses for a given neighborhood, accesses may also be performed sequentially.

Pending Cache Access Requests

Multiple cache accesses may be requested faster than they can be processed. Thus, each cache access request may be monitored such that each request may be processed. Information regarding each pending cache access request is also useful to determine which pending request is for the same or different cache line (or bank, or set, etc.) as the cache access being currently performed. Consequently, a list of requested cache accesses (referred to as pending cache access requests) may be utilized. Due to the multidimensional aspect of the cache and the multidimensional aspect of the cache tags, the pending cache access requests may be sorted based on their relation to the various cache banks and tags. As a result, in one or more embodiments, the pending cache access request list may be in multiple banks that are interleaved by the two or more dimensional coordinates of the cache line that the pending request is waiting for. Once a cache bank is free (i.e., not being accessed by another cache request), any pending request for a cache line in that bank may be processed in the next clock cycle (in parallel with other cache requests). Further, comparisons between the pending requests and active requests may be performed in parallel and limited to the corresponding cache bank due to the interleaving of the pending request list.

Embodiment of General-Purpose Computer Environment

Figure 10A:
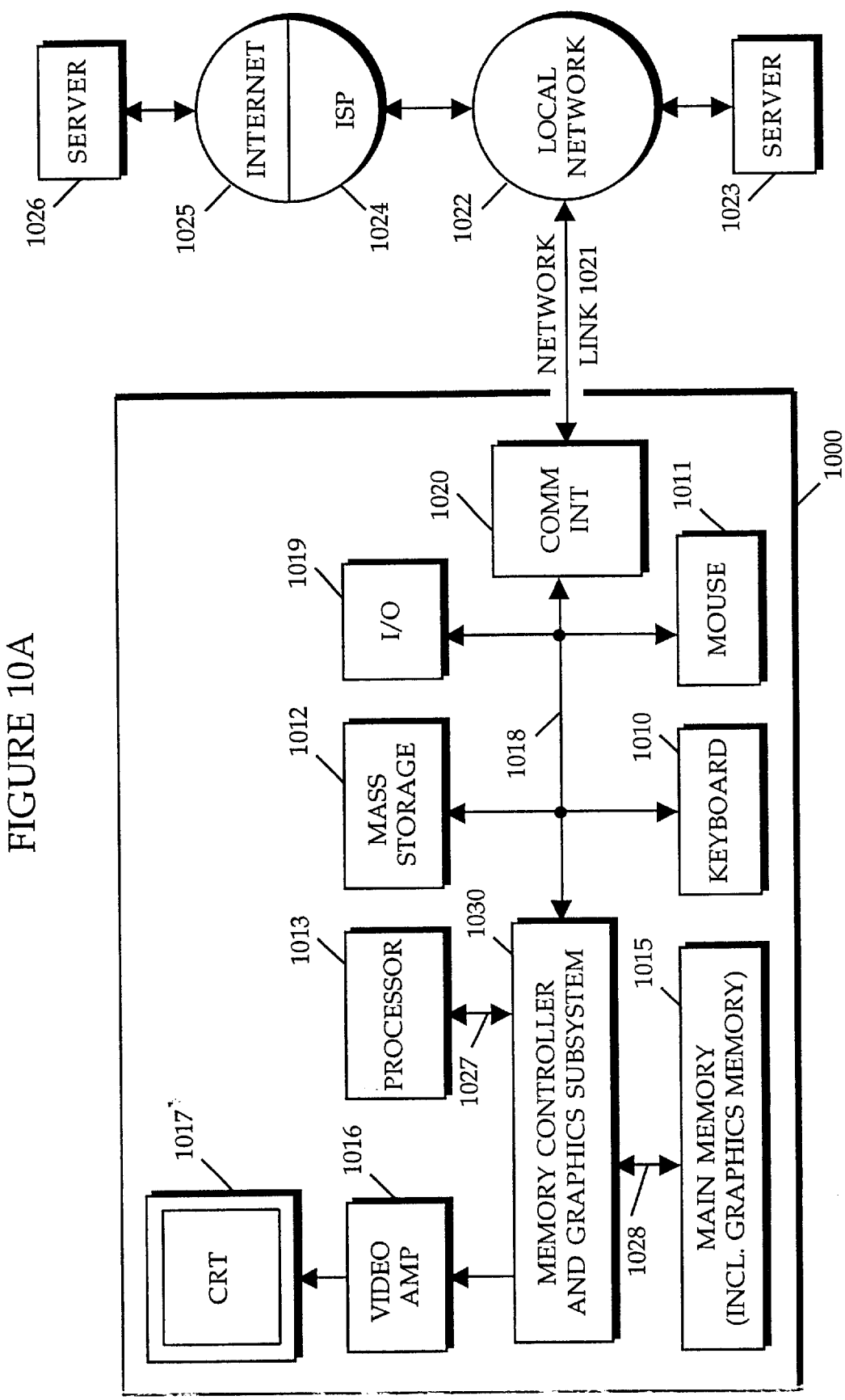
FIGS. 10A and 10B are examples of a general purpose computer system in which an embodiment of the invention may be implemented.
Figure 10B:
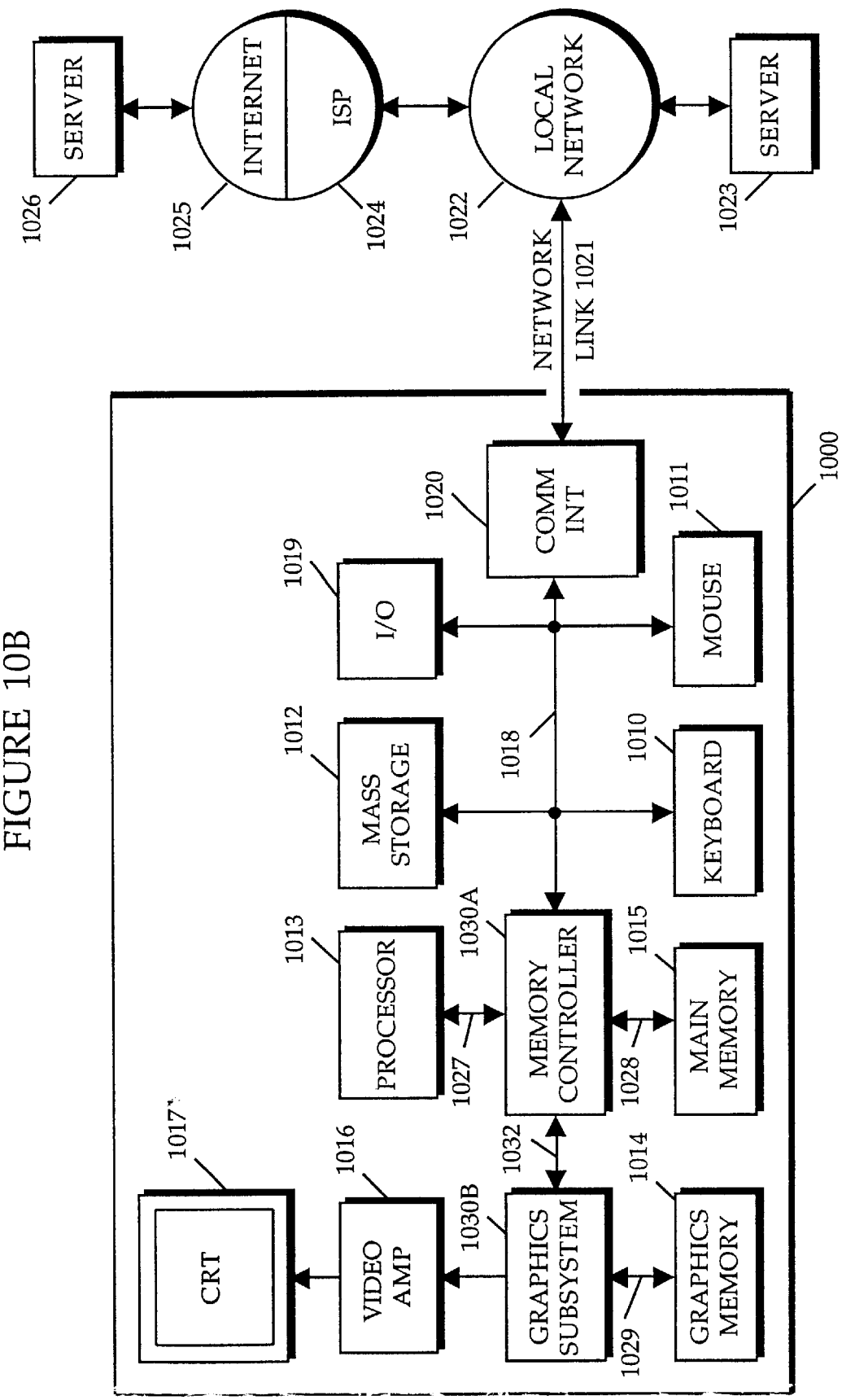

An embodiment of the invention can be implemented as computer hardware or a combination of computer software (or firmware) and hardware in a general purpose computer such as the embodiments of computer 1000 illustrated in FIGS. 10A and 10B. The embodiment of FIG. 10A includes a combined memory controller and graphics subsystem accessing a main memory, whereas the embodiment of FIG. 10B includes a graphics subsystem with graphics memory separate from the memory controller and main memory.

In FIG. 10A, keyboard 1010, mouse 1011, I/O unit 1019 and mass storage 1012 are coupled to a bi-directional I/O bus 1018. The keyboard and mouse are for introducing user input to the computer system and communicating that user input to processor 1013. Other suitable input devices may be used in addition to, or in place of, the mouse 1011 and keyboard 1010. I/O (input/output) unit 1019 represents such I/O elements as a printer, A/V (audio/video) I/O, etc. Mass storage 1012 may include both fixed and removable media, such as magnetic, optical or magnetic optical storage systems or any other available mass storage technology.

Memory controller and graphics subsystem 1030 is coupled to I/O bus 1018, video amplifier 1016, processor 1013 (via processor bus 1027) and main memory 1015 (via main memory bus 1028). Memory controller and graphics subsystem 1030 provides an interface between processor 1013, main memory 1015, video amplifier 1016 and the components of I/O bus 1018. An embodiment of the invention may be implemented as part of memory controller and graphics subsystem 1030. The memory controller and graphics subsystem may provide 2-D (two-dimensional) and/or 3-D (three-dimensional) graphics processing capability for the computer system in the form of hardware and software. Memory controller and graphics subsystem 1030 can load graphical data, such as texture images and graphical object models, from main memory 1015 or mass storage 1012 to perform pixel rendering operations for display. The graphical output of memory controller and graphics subsystem 1030 is typically forwarded to a frame buffer for display via video amp 1016 and CRT 1017.

Busses 1018, 1027 and 1028 may contain, for example, thirty-two address lines for addressing coupled components, and a 32-bit data bus for transferring data between and among the components. Alternatively, multiplexed data/address lines may be used instead of separate data and address lines. Bus widths other than 32-bits may also be used.

In one embodiment of the invention, processor 1013 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1015 comprises dynamic random access memory (DRAM), and may further comprise graphics memory for use in graphical processing, though standard DRAM may be used to perform graphical processing as well. Video amplifier 1016 is used to drive the cathode ray tube (CRT) raster monitor 1017. Video amplifier 1016 is well known in the art and may be implemented by any suitable apparatus. This circuitry converts pixel data stored in a frame buffer in memory controller and graphics subsystem 1030 to a raster signal suitable for use by monitor 1017. Monitor 1017 is a type of monitor suitable for displaying graphic images. Alternatively, memory controller and graphics subsystem 1030 may be used to drive a flat panel or liquid crystal display (LCD), or any other suitable data presentation device.

Computer 1000 may also include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Communication interface 1020 could also be a cable modem or wireless interface. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by an Internet Service Provider (ISP) 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Computer 1000 can send messages and receive data, including program code, through the network(s), network link 1021, and communication interface 1020. In the Internet example, remote server computer 1026 might transmit a request for an application program or data through Internet 1025, ISP 1024, local network 1022 and communication interface 1020.

The received data may be stored in mass storage 1012, or other non-volatile storage for later use. In this manner, computer 1000 may obtain data in the form of a carrier wave. In accordance with an embodiment of the invention, such data may include texture image data or graphical object data as described herein.

FIG. 10B illustrates a further embodiment of a general purpose computer wherein the graphics subsystem is implemented as a functional block separate from the memory controller, and wherein the graphics subsystem is configured with separate graphics memory 1014 accessible over a graphics memory bus 1029. As with memory controller and graphics subsystem 1030 of FIG. 10A, memory controller 1030A of FIG. 10B is coupled to processor 1013, main memory 1015 and I/O bus 1018. However, in FIG. 10B, memory controller 1030A interfaces with graphics subsystem 1030B via a graphics bus 1032 for handling of graphical output and certain graphical processing functions (e.g., pixel rendering). Graphical subsystem 1030B is equipped with graphics memory 1014 for storing texture image data or other graphical processing data. As with FIG. 10A, graphical output of graphics subsystem 1030B may be stored in a frame buffer (not shown) and output for display via video amplifier 1016 and monitor 1017.

The computer systems described above are for purposes of example only. An embodiment of the invention may be implemented in any type of computer system or graphics processing environment.

Thus, a method and apparatus for caching graphics information and direct mapped cache is described in conjunction with one or more specific embodiments. The invention is defined by the claims and their full scope of equivalents.

What is claimed is:

1. A method for accessing tag information in memory comprising:
    obtaining an address of pixel texture image coordinates;
    obtaining a first subset of s and t bits to indicate a tag index;
    obtaining a second subset of s and t bits to indicate a tag bank; and
    performing a plurality of accesses of said tag information in said memory using cache line texture image coordinates, said cache line texture image coordinates comprising said first subset and said second subset, wherein said cache line texture image coordinates are interleaved across said memory.

2. The method of claim 1 wherein said cache line texture image coordinates are interleaved across one or more banks.

3. The method of claim 1 wherein said cache line texture image coordinates are interleaved across one or more ports.

4. The method of claim 1 wherein said cache line texture image coordinates are two dimensional.

5. The method of claim 1 wherein said cache line texture image coordinates are three or more dimensional.

6. The method of claim 1 wherein said pixel texture image coordinates are two dimensional.

7. The method of claim 1 wherein said pixel texture image coordinates are three or more dimensional.

8. The method of claim 7 wherein one of said dimensions is a level of detail with mipmapped images.

9. The method of claim 7 wherein one of said dimensions is a image or array number.

10. A method for accessing information in cache memory, said cache memory comprising a plurality of storage elements uniquely identified by a tag, said method comprising:
    obtaining an address of pixel texture image coordinates;
    obtaining a first subset of s and t bits to indicate a tag index;
    obtaining a second subset of s and t bits to indicate a tag bank; and
    performing a plurality of accesses of said information in said cache memory using texel texture image coordinates, said textel texture image coordinates comprising said first subset and said second subset, wherein said texel texture image coordinates are interleaved across said cache memory.

11. The method of claim 10 wherein said texel texture image coordinates are interleaved across one or more banks.

12. The method of claim 10 wherein said texel texture image coordinates are interleaved across one or more ports.

13. The method of claim 10 wherein said texel texture image coordinates are two dimensional.

14. The method of claim 10 wherein said texel texture image coordinates are three or more dimensional.

15. The method of claim 10 wherein said pixel texture image coordinates are two dimensional.

16. The method of claim 10 wherein said pixel texture image coordinates are three or more dimensional.

17. The method of claim 16 wherein one of said dimensions is a level of detail with mipmapped images.

18. The method of claim 16 wherein one of said dimensions is a image or array number.

19. A method for accessing texel image information in memory, said method comprising:
    obtaining pixel texture image coordinates;
    obtaining a plurality of texel image coordinates by performing a neighborhood operation using said pixel texture image coordinates, each of said plurality of texel image coordinates uniquely identified by a tag;
    performing a plurality of accesses of said texel image information in said memory using said texel image coordinates, wherein said texel image coordinates are comprised of a first subset of s and t bits to indicate a tag index and a second subset of s and t bits to indicate a tag bank.

20. The method of claim 19 wherein said memory is cache memory.

21. The method of claim 20 wherein said performing a plurality of accesses step is performed across a plurality of cache memory banks and said texel image information is interleaved across said cache memory banks.

22. The method of claim 19 wherein said memory is tag memory.

23. The method of claim 22 wherein said performing a plurality of accesses step is performed across a plurality of tag memory banks and said texel image information is interleaved across said tag memory banks.

24. The method of claim 19 wherein said neighborhood operation comprises an arithmetic operation.

25. The method of claim 19 wherein said neighborhood operation comprises a logical operation.

26. The method of claim 19 wherein said neighborhood operation comprises texture filter operation.

27. The method of claim 19 wherein said texel image coordinates are two dimensional.

28. The method of claim 19 wherein said texel image coordinates are three or more dimensional.

29. The method of claim 19 wherein said performing a plurality of accesses of said texel image information are performed in parallel.

30. The method of claim 19 wherein said performing a plurality of accesses of said texel image information are performed serially.

31. A method for processing pending cache access requests comprising obtaining a pending cache access request from memory based on texture image coordinates of a cache line, said texture image coordinates comprised of a first subset of s and t bits to indicate a tag index and a second subset of s and t bits to indicate a tag bank, said memory interleaved by said texture image coordinates of said cache line.

32. The method of claim 31 wherein said memory is interleaved across one or more banks.

33. The method of claim 31 wherein said memory is interleaved across one or more ports.

34. The method of claim 31 wherein said texture image coordinates are two dimensional.

35. The method of claim 31 wherein said texture image coordinates are three or more dimensional.

36. The method of claim 35 wherein one of said dimensions is a level of detail with mipmapped images.

37. The method of claim 35 wherein one of said dimensions is a image or array number.

38. A computer program product comprising:
a computer usable medium having computer readable program code embodied therein for accessing tag image information in memory, said computer program product comprising:
computer readable code configured to cause a computer to obtain an address of pixel texture image coordinates;
computer readable code configured to cause a computer to obtain a first subset of s and t bits to indicate a tag index;
computer readable code configured to cause a computer to obtain a second subset of s and t bits to indicate a tag bank; and
computer readable code configured to cause said computer to perform a plurality of accesses of said tag information in said memory using cache line texture image coordinates, said cache line texture image coordinates comprising said first subset and said second subset, wherein said cache line texture image coordinates are interleaved across said memory.

39. The computer program product of claim 38 wherein said cache line texture image coordinates are interleaved across one or more banks.

40. The computer program product of claim 38 wherein said cache line texture image coordinates are interleaved across one or more ports.

41. The computer program product of claim 38 wherein said cache line texture image coordinates are two dimensional.

42. The computer program product of claim 38 wherein said cache line texture image coordinates are three or more dimensional.

43. The computer program product of claim 38 wherein said pixel texture image coordinates are two dimensional.

44. The computer program product of claim 38 wherein said pixel texture image coordinates are three or more dimensional.

45. The computer program product of claim 44 wherein one of said dimensions is a level of detail with mipmapped images.

46. The computer program product of claim 44 wherein one of said dimensions is a image or array number.

47. A computer program product comprising:
a computer usable medium having computer readable program code embodied therein for accessing information in cache memory, said cache memory comprising a plurality of storage elements uniquely identified by a tag, said computer program product comprising:
computer readable code configured to cause a computer to obtain an address of pixel texture image coordinates;
computer readable code configured to cause a computer to obtain a first subset of s and t bits to indicate a tag index;
computer readable code configured to cause a computer to obtain a second subset of s and t bits to indicate a tag bank; and
computer readable code configured to cause a computer to perform a plurality of accesses of said information in said cache memory using texel texture image coordinates, said texel texture image coordinates comprising said first subset and said second subset, wherein said texel texture image coordinates are interleaved across said cache memory.

48. The computer program product of claim 47 wherein said texel texture image coordinates are interleaved across one or more banks.

49. The computer program product of claim 47 wherein said texel texture image coordinates are interleaved across one or more ports.

50. The computer program product of claim 47 wherein said texel texture image coordinates are two dimensional.

51. The computer program product of claim 47 wherein said texel texture image coordinates are three or more dimensional.

52. The computer program product of claim 47 wherein said pixel texture image coordinates are two dimensional.

53. The computer program product of claim 47 wherein said pixel texture image coordinates are three or more dimensional.

54. The computer program product of claim 53 wherein one of said dimensions is a level of detail with mipmapped images.

55. The computer program product of claim 53 wherein one of said dimensions is a image or array number.

56. A computer program product comprising:
a computer usable medium having computer readable program code embodied therein for accessing texel image information in memory, said computer program product comprising:
computer readable code configured to cause a computer to obtain pixel texture image coordinates;
computer readable code configured to cause a computer to obtain a plurality of texel image coordinates by performing a neighborhood operation using said pixel texture image coordinates, each of said plurality of texel image coordinates uniquely identified by a tag, said tag comprising a first subset of s and t bits to indicate a tag index and a second subset of s and t bits to indicate a tag bank; and computer readable code configured to cause a computer to perform a plurality of accesses of said texel image information in said memory using said texel image coordinates.

57. The computer program product of claim 56 wherein said memory is cache memory.

58. The computer program product of claim 57 wherein said computer readable code configured to cause a computer to perform a plurality of accesses step is performed across a plurality of cache memory banks and said texel image information is interleaved across said cache memory banks.

59. The computer program product of claim 56 wherein said memory is tag memory.

60. The computer program product of claim 59 wherein said computer readable code configured to cause a computer to perform a plurality of accesses step is performed across a plurality of tag memory banks and said texel image information is interleaved across said tag memory banks.

61. The computer program product of claim 56 wherein said neighborhood operation comprises an arithmetic operation.

62. The computer program product of claim 56 wherein said neighborhood operation comprises a logical operation.

63. The computer program product of claim 56 wherein said neighborhood operation comprises texture filter operation.

64. The computer program product of claim 56 wherein said texel image coordinates are two dimensional.

65. The computer program product of claim 56 wherein said texel image coordinates are three or more dimensional.

66. The computer program product of claim 56 wherein said performing a plurality of accesses of said texel image information are performed in parallel.

67. The computer program product of claim 56 wherein said computer readable code configured to cause a computer to perform a plurality of accesses of said texel image information are performed serially.

68. A computer program product comprising a computer usable medium having a computer readable program code embodied therein for processing pending cache access requests, said computer program product comprising computer readable program code configured to cause a computer to obtain a pending cache access request from memory based on texture image coordinates of a cache line, said texture image coordinates comprising a first subset of s and t bits to indicate a tag index and a second subset of s and t bits to indicate a tag bank, said memory interleaved by said texture image coordinates of said cache line.

69. The computer program product of claim 68 wherein said memory is interleaved across one or more banks.

70. The computer program product of claim 68 wherein said memory is interleaved across one or more ports.

71. The computer program product of claim 68 wherein said texture image coordinates are two dimensional.

72. The computer program product of claim 68 wherein said texture image coordinates are three or more dimensional.

73. The computer program product of claim 72 wherein one of said dimensions is a level of detail with mipmapped images.

74. The computer program product of claim 72 wherein one of said dimensions is a image or array number.

75. A system comprising
a processor;
a memory coupled to said processor;
code executed by said processor for accessing tag information in memory;
said code comprising:
a method obtaining an address of pixel texture image coordinates;
a method of obtaining a first subset of s and t bits to indicate a tag index;
a method of obtaining a second subset of s and t bits to indicate a tag bank; and
a method performing a plurality of accesses of said tag information in said memory using cache line texture image coordinates, said cache line texture image coordinates comprising said first subset and said second subset, wherein said cache line texture image coordinates are interleaved across said memory.

76. The system of claim 75 wherein said cache line texture image coordinates are interleaved across one or more banks.

77. The system of claim 75 wherein said cache line texture image coordinates are interleaved across one or more ports.

78. The system of claim 75 wherein said cache line texture image coordinates are two dimensional.

79. The system of claim 75 wherein said cache line texture image coordinates are three or more dimensional.

80. The system of claim 75 wherein said pixel texture image coordinates are two dimensional.

81. The system of claim 75 wherein said pixel texture image coordinates are three or more dimensional.

82. The system of claim 81 wherein one of said dimensions is a level of detail with mipmapped images.

83. The system of claim 81 wherein one of said dimensions is a image or array number.

84. A system comprising
a processor;
a memory coupled to said processor;
code executed by said processor for accessing information in cache memory, said cache memory comprising a plurality of storage elements uniquely identified by a tag;
said code comprising:
a method obtaining an address of pixel texture image coordinates;
a method of obtaining a first subset of s and t bits to indicate a tag index;
a method of obtaining a second subset of s and t bits to indicate a tag bank; and
a method performing a plurality of accesses of said information in said cache memory using texel texture image coordinates, said texel texture image coordinates comprising said first subset and said second subset, wherein said textel texture image coordinates are interleaved across said cache memory.

85. The system of claim 84 wherein said texel texture image coordinates are interleaved across one or more banks.

86. The system of claim 84 wherein said texel texture image coordinates are interleaved across one or more ports.

87. The system of claim 84 wherein said texel texture image coordinates are two dimensional.

88. The system of claim 84 wherein said texel texture image coordinates are three or more dimensional.

89. The system of claim 84 wherein said pixel texture image coordinates are two dimensional.

90. The system of claim 84 wherein said pixel texture image coordinates are three or more dimensional.

91. The system of claim 90 wherein one of said dimensions is a level of detail with mipmapped images.

92. The system of claim 90 wherein one of said dimensions is a image or array number.

93. A system comprising
a processor;

a memory coupled to said processor;

code executed by said processor for accessing texel image information in memory;

said code comprising:

a method obtaining pixel texture image coordinates;

a method obtaining a plurality of texel image coordinates by performing a neighborhood operation using said pixel texture image coordinates, each of said plurality of texel image coordinates uniquely identified by a tag, said tag comprising a first subset of s and t bits to indicate a tag index and a second subset of s and t bits to indicate a tag bank; and a method performing a plurality of accesses of said texel image information in said memory using said texel image coordinates.

94. The system of claim 93 wherein said memory is cache memory.

95. The system of claim 94 wherein said method performing a plurality of accesses is performed across a plurality of cache memory banks and said texel image information is interleaved across said cache memory banks.

96. The system of claim 93 wherein said memory is tag memory.

97. The system of claim 96 wherein said method performing a plurality of accesses is performed across a plurality of tag memory banks and said texel image information is interleaved across said tag memory banks.

98. The system of claim 93 wherein said neighborhood operation comprises an arithmetic operation.

99. The system of claim 93 wherein said neighborhood operation comprises a logical operation.

100. The system of claim 93 wherein said neighborhood operation comprises texture filter operation.

101. The system of claim 93 wherein said texel image coordinates are two dimensional.

102. The system of claim 93 wherein said texel image coordinates are three or more dimensional.

103. The system of claim 93 wherein said performing a plurality of accesses of said texel image information are performed in parallel.

104. The system of claim 93 wherein said performing a plurality of accesses of said texel image information are performed serially.

105. A system comprising a processor;

a memory coupled to said processor;

code executed by said processor for processing pending cache access requests;

said code comprising:

a method obtaining a pending cache access request from memory based on texture image coordinates of a cache line, said texture image coordinates comprising a first subset of s and t bits to indicate a tag index and a second subset of s and t bits to indicate a tag bank, said memory interleaved by said texture image coordinates of said cache line.

106. The system of claim 105 wherein said memory is interleaved across one or more banks.

107. The system of claim 105 wherein said memory is interleaved across one or more ports.

108. The system of claim 105 wherein said texture image coordinates are two dimensional.

109. The system of claim 105 wherein said texture image coordinates are three or more dimensional.

110. The system of claim 109 wherein one of said dimensions is a level of detail with mipmapped images.

111. The system of claim 109 wherein one of said dimensions is a image or array number.

\* \* \* \* \*